United States Patent
Roby et al.

(10) Patent No.: US 10,542,151 B2
(45) Date of Patent: Jan. 21, 2020

(54) SYSTEM AND METHOD FOR USING A MOBILE APPLICATION OPERATING ON AN ADVISOR DEVICE TO COMMUNICATE WITH A CLIENT DEVICE

(71) Applicants: Fred Roby, Chino, CA (US); Stephen Jason Freeland, Los Feliz, CA (US)

(72) Inventors: Fred Roby, Chino, CA (US); Stephen Jason Freeland, Los Feliz, CA (US)

(*) Notice: Subject to any disclaimer, the term of this patent is extended or adjusted under 35 U.S.C. 154(b) by 0 days.

(21) Appl. No.: 16/103,785

(22) Filed: Aug. 14, 2018

(65) Prior Publication Data

US 2018/0352093 A1 Dec. 6, 2018

Related U.S. Application Data

(63) Continuation of application No. 15/919,184, filed on Mar. 12, 2018, now abandoned, which is a continuation of application No. 15/669,683, filed on Aug. 4, 2017, now abandoned, which is a continuation of application No. 15/381,930, filed on Dec. 16, 2016, now abandoned.

(51) Int. Cl.
*H04M 7/00* (2006.01)
*H04M 3/42* (2006.01)
*G06F 21/31* (2013.01)

(52) U.S. Cl.
CPC ........ *H04M 7/0078* (2013.01); *G06F 21/313* (2013.01); *H04M 3/42008* (2013.01); *H04M 7/0066* (2013.01)

(58) Field of Classification Search
CPC .......... H04M 7/0078; H04M 3/42008; H04M 7/0066; G06F 21/313
USPC .................................................. 379/201.11
See application file for complete search history.

(56) References Cited

U.S. PATENT DOCUMENTS

2009/0097492 A1* 4/2009 Monette .............. H04L 12/4658
370/401
2012/0072601 A1* 3/2012 Bharadwaj .......... H04L 65/1016
709/228

* cited by examiner

*Primary Examiner* — Quynh H Nguyen
(74) *Attorney, Agent, or Firm* — Fitzsimmons IP Law

(57) ABSTRACT

A system and method is provided for facilitating a communication between a client and an advisor. The system preferably includes a client device, an advisor device, and a host device, all connected via a network. The client device may interact with a website to request a communication with an advisor. The host device may provide the request to the advisor via a mobile application operating on the advisor device. The mobile application may also be used to upload data to the host device and to participate in the scheduled communication, such as a telephone call. Prior to using the application to participate in the communication, the host device may verify the application by calling it and verbally requesting the entry of verification data. If the advisor enters correct data, the application will be considered verified, and the advisor can use it to participate in the scheduled communication with the client.

20 Claims, 25 Drawing Sheets

SYSTEM AND METHOD FOR USING A MOBILE APPLICATION OPERATING ON AN ADVISOR DEVICE TO COMMUNICATE WITH A CLIENT DEVICE

BACKGROUND OF THE INVENTION

1. Field of the Invention

The present invention relates to a network-connected host device, and more particularly, to a system and method for using a network-connected host device to facilitate a communication between at least a first party (e.g., a client) and a second party (e.g., an advisor) while maintaining a certain level of anonymity therebetween, thereby allowing the parties to communicate with one another using different types of communication methods and/or devices.

2. Description of Related Art

Every day, hundreds of millions of people communicate with each other over various networks. For example, some people communicate using telecommunication devices (e.g., cellular telephones, landlines, etc.) connected via telecommunication networks (e.g., satellites, telephone lines, fiber-optic lines, etc.), while others communicate using computers (e.g., smartphones, personal computers, etc.) connected via a wide area network, like the Internet. While most communications are direct communications, in that one party is communicating directly with another party (e.g., via a telephone call, a text message, etc.), other communications are indirect, and involve at least one intermediary person or device. For example, there are hundreds, if not thousands of social networking sites whose primary purpose is to act as an intermediary, and connect (or introduce) one party to another. Examples of such social networking sites include Facebook™, Match.com™, and CaliforniaPsychics.com™.

Social networking sites generally include pay services, where services are paid for either after or before services are rendered. For example, dating websites, like eHarmony.com™, charge to put individuals in communication with one another. They do so by matching individuals that have similar interests, compatibilities, etc. Other examples are service referral sites, like AngiesList.com™, which charge to locate companies or individuals that perform certain services, such as automobile repair.

There are several drawbacks to such business models. First, once individuals are introduced to one another, there is nothing prohibiting them from continuing their relationship outside of the site, or without paying for future services. For example, if an individual uses a service referral site to locate a mechanic, there is nothing that prevents the individual from contacting the mechanic directly (i.e., without using the service referral site) in the future. Second, the communication method chosen by the first party generally dictates the communication device that the second party must use. For example, if the first party decides to communicate via a web page, then the second party must use a device that is capable of viewing websites, such as a personal computer connected to the Internet. Similarly, if the first party decides to place a telephone call, then the second party must use a device that is capable of receiving telephone calls, such as a landline or cellular telephone.

Therefore, there is a need to develop a system and method that addresses at least some of the foregoing drawbacks. In particular, there is a need to develop a system and method that uses a host device to facilitate communications between at least first and second parties (e.g., a client, an advisor, etc.). By using the host device to schedule, establish, and maintain communications between the parties, the system prevents (or at least makes it more difficult for) direct communications between the parties in the future. And by using a network host to facilitate communications, different devices can be used by different parties. As long as the device used by the party is supported by the host device, it can be used to participate in a communication.

SUMMARY OF THE INVENTION

The present invention provides a system and method for facilitating a communication between a client and an advisor. Preferred embodiments of the present invention operate in accordance with at least one client device, at least one advisor device, and a host device, all connected via a network.

In one embodiment of the present invention, a client communicates with the host device to request a communication with an advisor. This request may be provided from a client device to a host device via a website. The host device may then notify the advisor of the request, e.g., via the website, by sending a text message to an advisor device, or via a mobile application operating on the advisor device. If the advisor accepts the request, then a confirmation will be provided to the client (e.g., via text messaging, etc.), and the host device will facilitate the communication at the schedule date/time.

A critical aspect of the invention is that the host device acts as an intermediary for all communications (e.g., requesting a communication, participating in a communication, etc.) between the client and the advisor. Not only does this ensure that the client and the advisor do not communicate outside of the system, but it allows different individuals to use different communication methods and/or different devices to communicate. For example, the client may use the website to send an advisor a general request for a communication. The host device may then reformat the request and send it to the advisor via a text message, or via a mobile application operating on the advisor's mobile device (e.g., smartphone). If the advisor accepts the request, then the host device may send a text message to the client's mobile device (e.g., smartphone), confirming the date/time for the communication. By way of another example, the scheduled communication (e.g., a reading by the advisor), which is facilitated by the host device, may be participated in by the client using a standard telephone (e.g., cell phone, cordless phone, etc.) and by the advisor using a mobile application (e.g., an application operating on the advisor's mobile device, etc.).

In one embodiment of the present invention, a mobile application is downloaded onto the advisor device (e.g., smartphone, tablet, etc.), opened (e.g., establishing a connection between the mobile application and the host device), and used to perform different functions. For example, the mobile application may be used to provide (or upload) information to the host device (e.g., providing the host device with the advisor's schedule, accepting a request for a communication, etc.), and receive (or download) information from the host device (e.g., providing the advisor with a communication request, reminding the advisor of a scheduled communication, etc.). This can be done by either opening the application, which may require the advisor to login, or via a notification service (e.g., push notification, etc.). And if the mobile application is so configured, it can also be used to place and receive telephone calls (e.g., using voice over Internet protocol (VoIP), session initiation protocol (SIP), etc.), allowing the advisor to participate in communications with clients.

In order to ensure that the mobile application can be used properly in telephone mode (e.g., to participate in a communication with a client), the host device may perform a verification test on the application. This is because while the client is held responsible for providing a callback number, and ensuring that they have sufficient coverage (if using a cellular telephone) to participate in the telephone call, the host device is responsible for verifying that the mobile application can be used by the advisor to participate in the same.

Verification may be performed by having the host device call the mobile application. The application may allow the advisor to either accept or decline the telephone call. If the advisor declines the call, or fails to accept the call, then the host device may consider the application (or call quality) "unverified." If the advisor accepts the call, the host device may verbally instruct the advisor (e.g., using speech generating software) that the purpose of the call is to verify the application and to enter verification data (e.g., using the telephone keypad, voice command(s), etc.). For example, the host device may instruct the advisor to press any key, press a particular key, or press a sequence of keys. If the data entered (or provided) by the advisor is correct, the host device will consider the application (or call quality) "verified," and the advisor will be allowed to use the application to participate in telephone calls with clients. The host device may then notify the advisor that the verification was successful, and store corresponding information (e.g., verification information) in a database.

One method of the present invention allows a client to schedule a communication with an advisor by providing a request for the communication to the host device (e.g., website, etc.). A decision is then made as to whether the communication will take place now or at a later time (e.g., later today, another day, etc.). If the client chooses "now," then a determination is made as to whether the client in online, which may include determining whether the mobile application operating on the advisor device has been verified. If the client is determined to be online, then a determination is made as to whether the advisor is available. If the advisor it available, then the host device may facilitate the communication by opening a communication channel between the client device and the mobile application operating on the advisor device. This may include calling the client device (e.g., using a callback number, etc.) to establish a first connection, calling the mobile application operating on the advisor device to establish a second connection, and using the first and second connections to allow the client and the advisor to verbally communicate with one another.

If the client choses to have the communication "later," or the advisor is not presently online, or the advisor is not presently available, a determination is made as to whether the advisor has provided a schedule. If the advisor has a schedule, then the client can select an available date/time therefrom. The host device would then facilitate the communication at the selected date/time. If the advisor does not have a schedule, then the client may request a date/time for a communication. The host device would then provide the request to the advisor, at which time the advisor would either accept or decline the request. If the request is accepted, the host device would then facilitate the communication at the accepted date/time. If the request is declined, the advisor may suggest a new date/time. This information would then be provided to the client, and if an agreement was reached, the host device would facilitate the communication at the agreed upon date/time.

Another method of the present invention is to allow the host device to verify a mobile application operating on an advisor device (e.g., smartphone, tablet, etc.). This may take place when the application is opened, logged onto, or otherwise used (or attempted to be used) to participate in a communication with a client (changing status from "offline" to "online"). The host device may verify the mobile application by placing a telephone call to the application. If the advisor answers the call, the host device may provide the advisor with verbal instructions for verifying the call quality of the mobile application. This may include, for example, instructing the advisor to press any key on their touchtone keypad, press a particular key (or sequence of keys) on their touchtone keypad, speak at least one command (e.g., repeat the speech being generated by the host device), etc. The provided data is then compared to actual verification data (e.g., predetermined, stored verification data). If the provided data does not match the stored verification data, then the mobile application is not verified. If, however, the provide data matches the stored verification data, then the mobile application is verified, which may involve storing verification data, or changing the status of the mobile application from "unverified" to "verified."

Another method of the present invention is to allow the host device to facilitate a communication between a client device and an advisor device, or a mobile application operating on the advisor device. In this embodiment, at the date/time for the scheduled communication, a determination is made as to whether the call quality of the mobile application operating on the advisor device has been verified. If the answer is "no," then a client device (e.g., cellular telephone, landline telephone, etc.) is called using a telephone number (e.g., a callback number) that was previously provided by the client and associated with the client device, and the advisor device (e.g., cellular telephone, landline telephone, etc.) is called using a telephone number that was previously provided by the advisor and associated with the advisor device. The connections with the client and advisor devices are then used to establish a communication between the client and the advisor. If, however, the call quality of the mobile application is verified, then the client device is called (e.g., using a callback number previously provided by the client), and a call is placed to the mobile application operating on the advisor device (e.g., using VoIP, SIP, etc.). The connections with the client device and the mobile application are then used to establish a communication between the client and the advisor.

A more complete understanding of a system and method for using a host device to schedule, establish, and maintain a communication between at least a first party (e.g., a client) and a second party (e.g., an advisor) will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIG. 6 shows a second exemplary web page that the client may access when requesting the communication with the advisor;

DETAILED DESCRIPTION OF THE PREFERRED EMBODIMENT

The present invention provides a system and method for facilitating a communication between a client and an advisor. It should be appreciated that while the present invention is described in terms of a client having a telephone call with an advisor, the present invention is not so limited. For example, the present invention could be used to facilitate (e.g., schedule, establish, maintain, etc.) any communication between any first party (e.g., any individual) and any second party (e.g., a financial advisor, spiritual advisor, psychic advisor, relationship advisor, medical advisor, etc.), or between more than two parties (e.g., a conference call, etc.).

Figure 1:
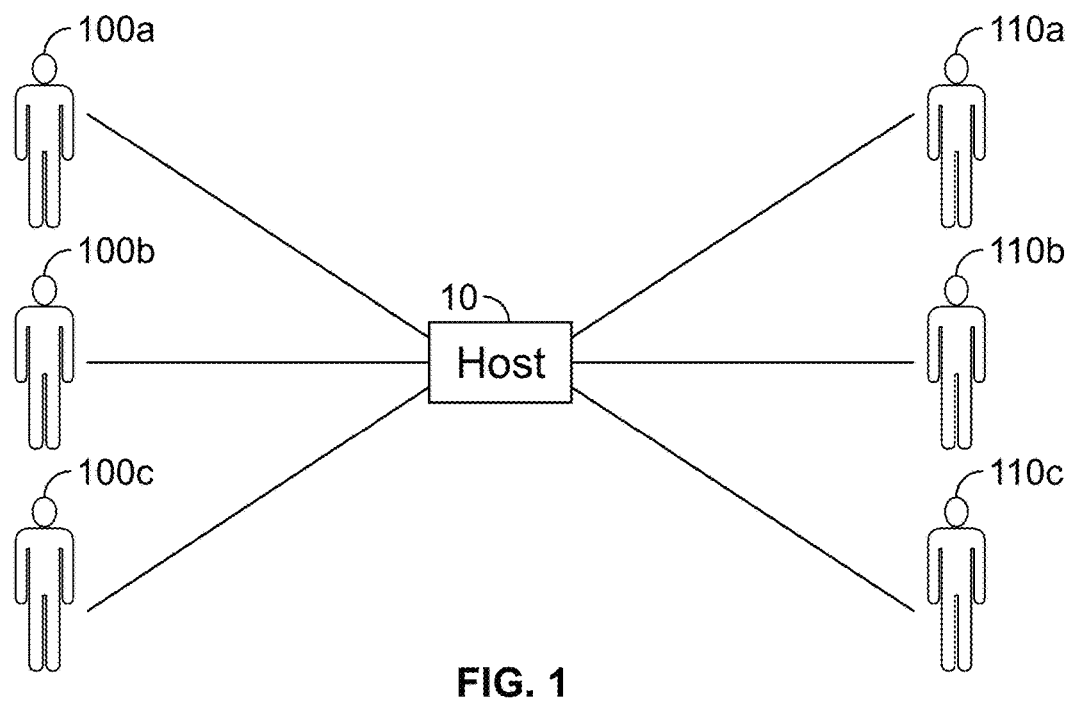
FIG. 1 illustrates an exemplary environment in which the present invention may operate, in which a host device communicates with a plurality of clients and a plurality of advisors.
Figure 2:
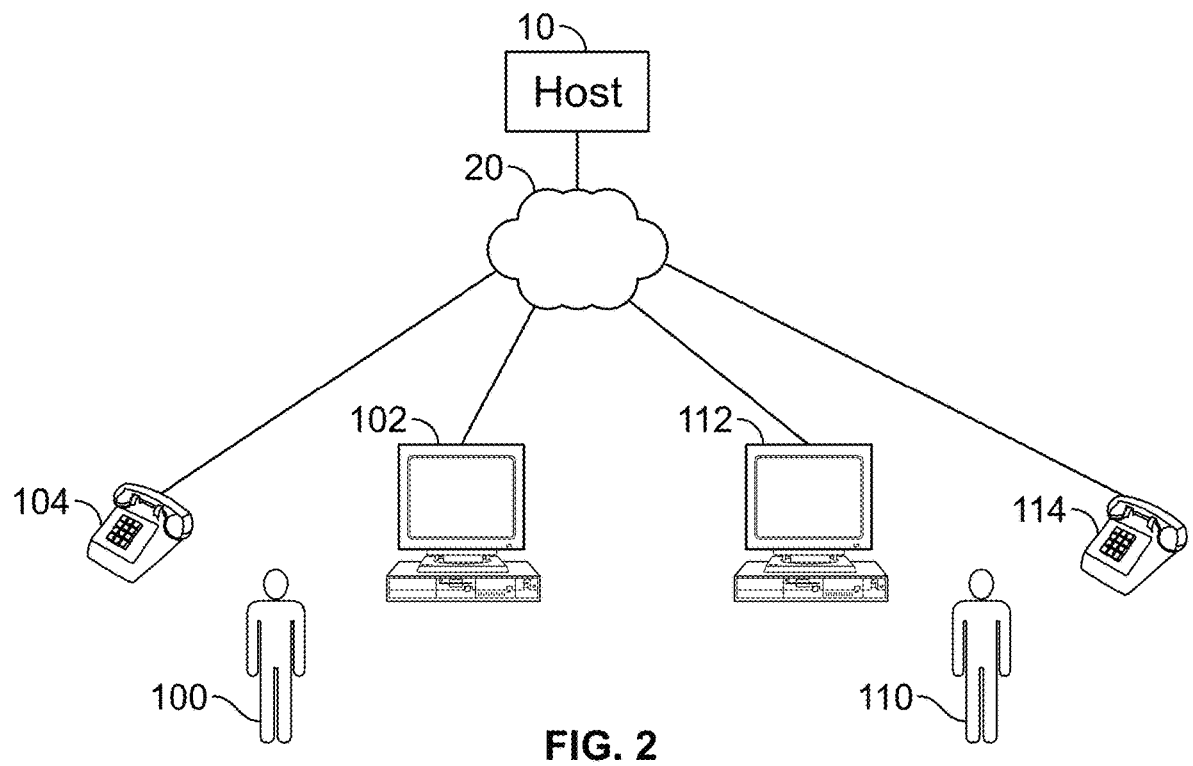
FIG. 2 illustrates an exemplary environment in which the present invention may operate, in which a host device communicates with at least one client device and at least one advisor device via at least one network.

In a preferred embodiment of the present invention, as shown in FIG. 1, a host device 10 is used to schedule, establish, and/or maintain bi-directional communication between at least one of a plurality of clients (i.e., 100a, 100b, 100c, etc.) and at least one of a plurality of advisors (i.e., 110a, 110b, 110c, etc.). In one embodiment of the present invention, each client (e.g., 100a) interacts with the host device 10 to schedule and participate in a communication with at least one advisor (e.g., 110a, etc.). Such an interaction is shown in FIG. 2, where a particular client 100 is using a first and/or second client device 102, 104 to interact with the host device 10 via a network 20. Similarly, a particular advisor 110 may also use a first and/or second advisor device 112, 114 to interact with the host device 10 via the network 20. For example, the advisor 110 may use the first advisor device 112 to instruct the host device of the advisor's availability (e.g., by interacting with a web server portion of the host device), the client 100 may use the first client device 102 to schedule a communication with the advisor at a date/time that the advisor is available (e.g., by interacting with a web server portion of the host device), and the client 100 and advisor 110 may use the second client device 104 and the second advisor device 114, respectively, to participate in the scheduled communication.

It should be appreciated that while the first and second client devices 102, 104 and the first and second advisor devices 112, 114 are shown as a personal computer and a landline telephone, respectively, the present invention is not so limited. For example, a system that is configured to communicate with any telecommunication device (e.g., a cordless telephone, a cellular telephone, a smartphone, etc.) or any computing device (e.g., a personal computer, a laptop, a tablet, a smartphone, etc.) is within the spirit and scope of the present invention. In fact, in one embodiment of the present invention, as discussed in greater detail below, the advisor device is preferably a smartphone (or tablet) configured to receive and place cellular telephone calls (e.g., using cellular telephone frequencies), to load, view, and interact with websites (e.g., via the Internet), and to download, open, and interact with mobile applications. It should also be appreciated that the network 20 shown in the figures is not limited to any particular network and can include, for example, any telecommunication network (e.g., satellite, telephone lines, fiber-optic lines, etc.), any wide area network (WAN) (e.g., the Internet), any local area network (LAN), or any combination thereof. For example, the client may be using a telephone, which is connected to a telecommunication network, to participate in the scheduled communication, and the advisor may be using a personal computer, which is connected to the Internet, to participate in the scheduled communication (e.g., via VoIP, etc.).

Figure 3:
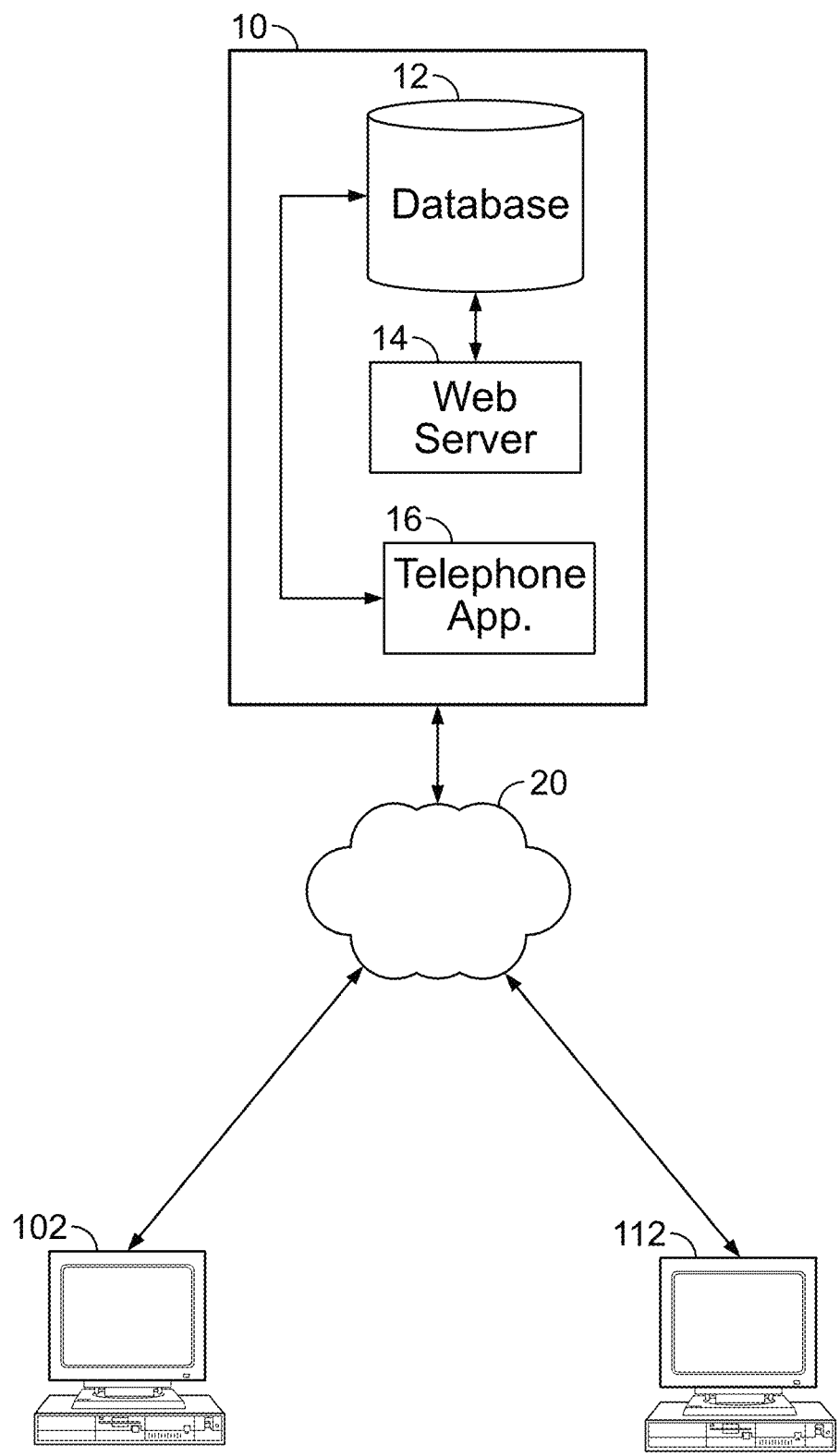
FIG. 3 illustrates a first embodiment of the present invention, in which a host device communicates with a first client device and a first advisor device over a network.
Figure 5:
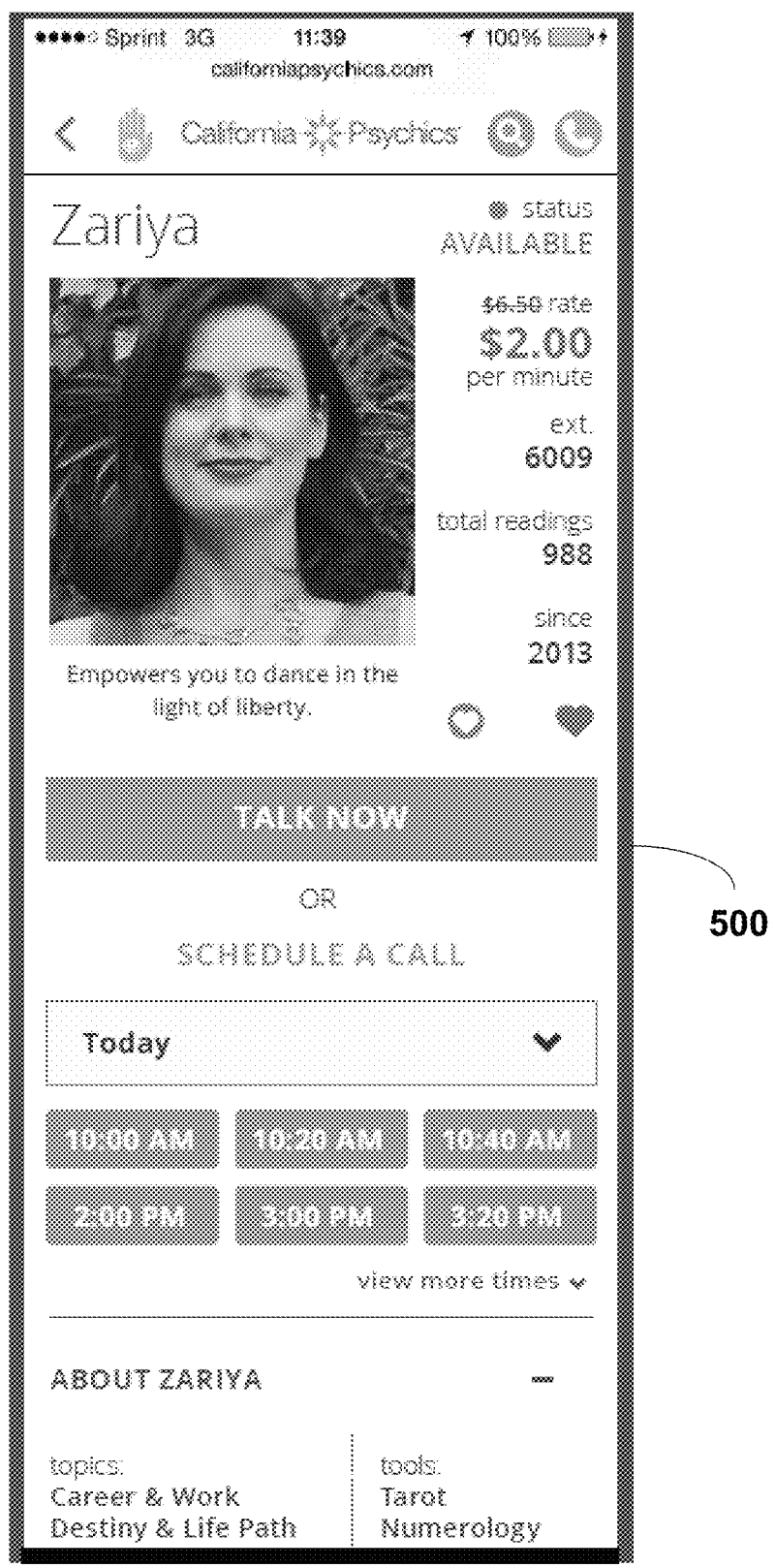
FIG. 5 shows a first exemplary web page that a client may access when requesting a communication with an advisor.

In accordance with a first embodiment of the present invention, as shown in FIG. 3, a client may use a first client device 102 to interact with the host 10 via the network 20. In a preferred embodiment, this is done by interacting with a web server 14, which is operating on the host device 10, in order to interact with a website. For example, by directing a web browser operating on the first client device 102 to a particular website, the client can be provided with a web page. As shown in FIG. 5, such a web page 500 may provide the client with a number of options, including the ability to schedule a communication with a particular advisor. It should be appreciated that the present invention is not limited to the features shown in FIG. 5. For example, the web page may allow the client to login to the website (e.g., via user name and password), to search for a particular advisor, and to view a personalized web page (e.g., showing client messages, scheduled communications, payment information, etc.). As with the client, the advisor can interact with the website via a web browser operating on the first advisor device (see FIG. 3 at 112). Information concerning the client and the advisor can be stored, for example, in a database (see FIG. 3 at 12).

Figure 6:
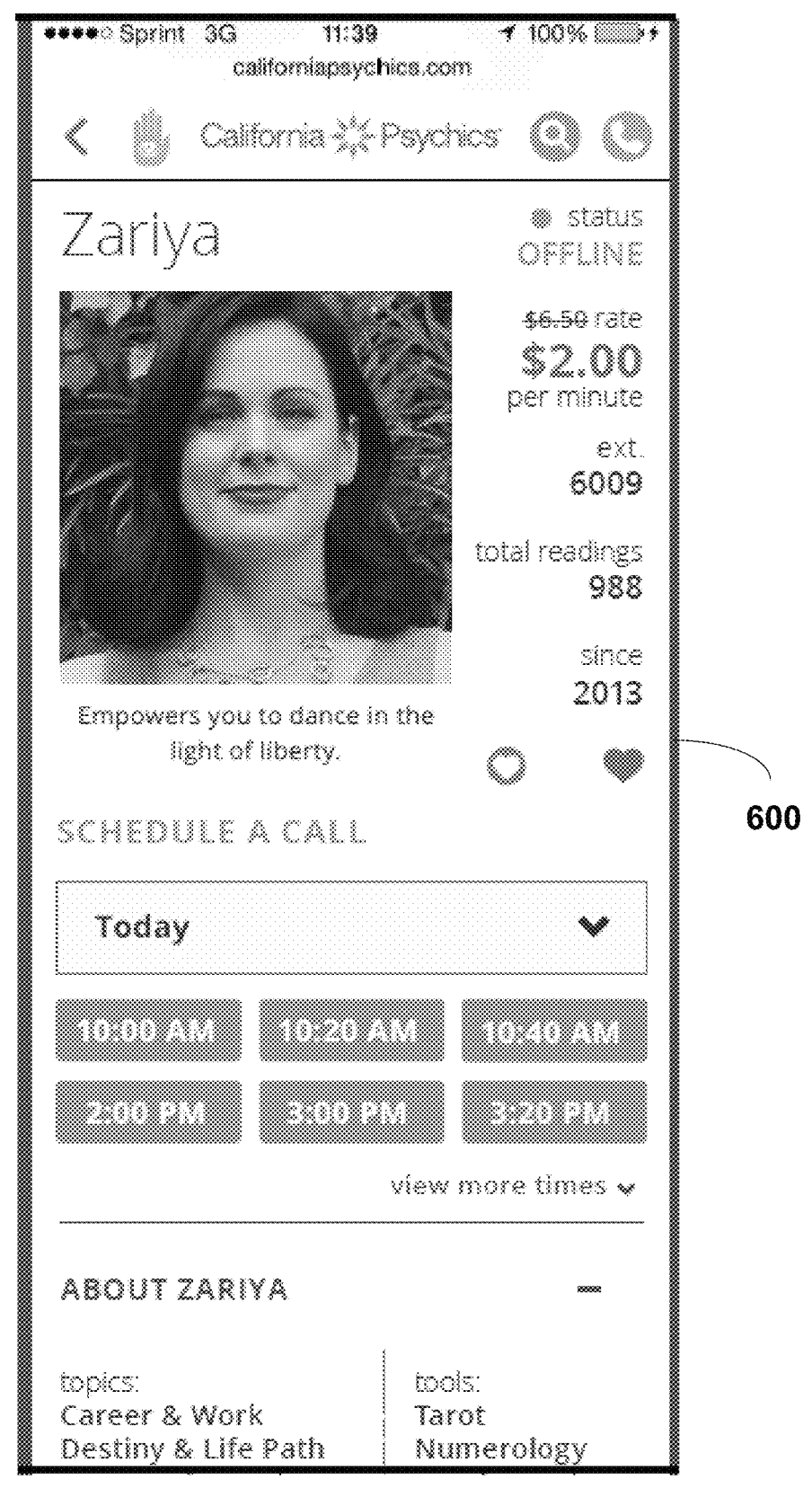
Figure 7:
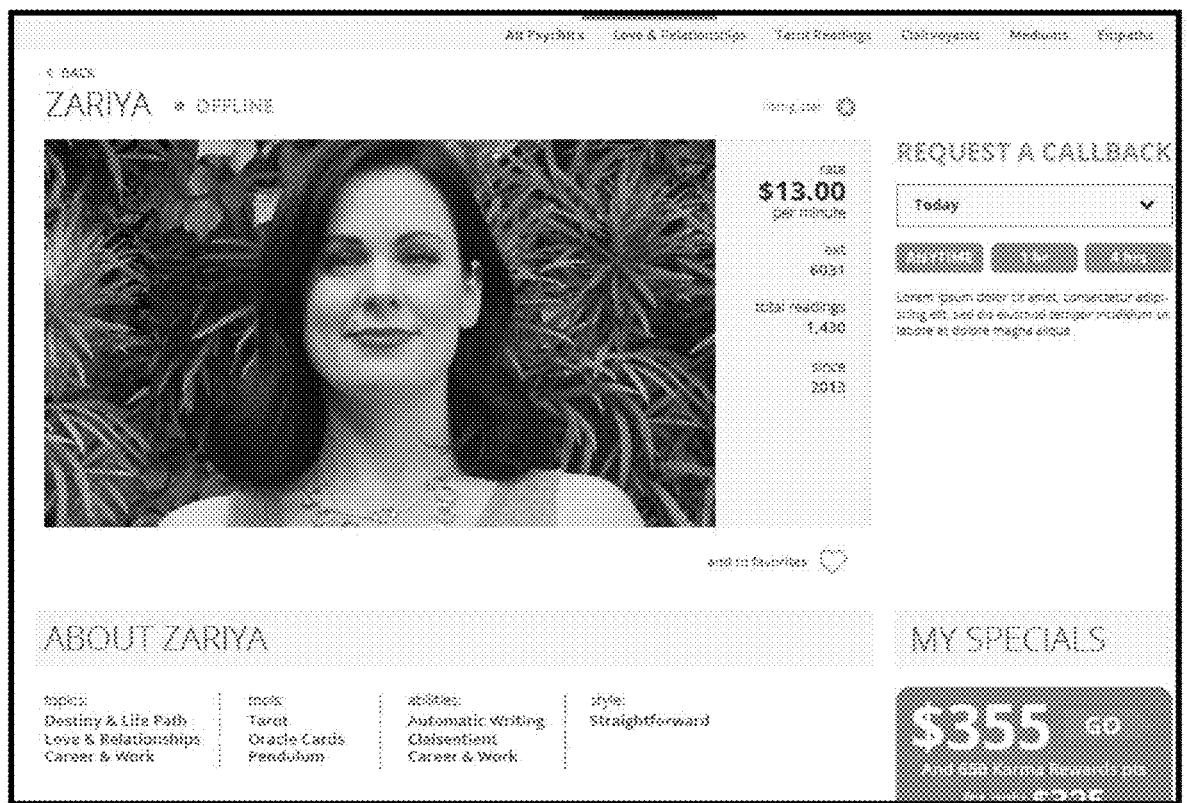
FIG. 7 shows a third exemplary web page that the client may access when requesting the communication with the advisor.

If the client chooses to schedule a communication with an advisor (see FIG. 5 at 500), the client may be presented with a list of options, including the ability to "talk now" or "schedule a call" in the future (e.g., later that day, on another day, etc.). If the client interacts (e.g., clicks on, etc.) the "talk now" feature, the client will be immediately (or shortly) connected to the advisor, assuming the advisor is available (e.g., is currently working, is not on another communication, does not have another communication scheduled shortly, etc.). As shown in FIG. 6, if the client interacts with the "schedule a call" feature, then the client may be able to schedule a call either later that day or on a another day. For example, as shown in FIG. 6, if the client selects "today" for a communication, the client will be provided with available time slots for the adviser (e.g., 10:00, 10:20, 10:40, etc.). As shown in FIG. 7, the client may also (or alternatively (e.g., if the advisor has no available time slots)) enter a more flexible request, such as anytime, anytime in the next hour, anytime in the next four hours, etc. These options may also be available for future communications. The client would merely select the desired date (not shown) and a preferred time (e.g., an available time slot, anytime, morning, afternoon, night, etc.).

In one embodiment of the present invention, the communication may be scheduled differently with the advisor than it is with the client. For example, an advisor's schedule may be divided into twenty minute time slots. If the advisor is available between 10:00 and 11:00, the host device may list three different available time slots for the advisor, i.e., 10:00, 10:20, and 10:40. If the client selects the first time slot (i.e., 10:00), then the advisor will see the scheduled communication at that time (i.e., 10:00-10:20). The client, however, will see (e.g., via the client account web page, via a confirmation text message, etc.) a scheduled communication between 10:00 and 11:00. This provides the advisor flexibility if the advisor is running behind schedule (e.g., the previous communication took longer than expected, the advisor needs a five minute break, etc.).

It should be appreciated that the present invention is not limited to the foregoing description concerning scheduling a communication. For example, because an advisor's availability may change day-by-day, or hour-by-hour, a client may desire to send the advisor a general request for a communication (e.g., requesting a communication on a particular day, at a particular time, etc.). As with all communications (e.g., a request for a telephone call, a telephone call, etc.), the host device acts as an intermediary between the client and the advisor. Not only does this ensure that the client and the advisor do not communicate outside of the system, but it allows different individuals to use different communication methods and/or different devices to communicate. For example, the client may use the website to send an advisor a general request for a communication. The host device may then reformat the request and send it to the advisor via a mobile application operating on the advisor's mobile device (e.g., smartphone). If the advisor accepts the request, then the host device may send a text message to the client's mobile device (e.g., smartphone), confirming the date and time for the communication. By way of another example, the scheduled communication (e.g., a telephone call), which is preferably facilitated by the host device, may be participated in by the client using a standard telephone (e.g., cell phone, cordless phone, etc.) and by the advisor using a mobile application (e.g., an application operating on the advisor's mobile device, etc.).

Figure 4:
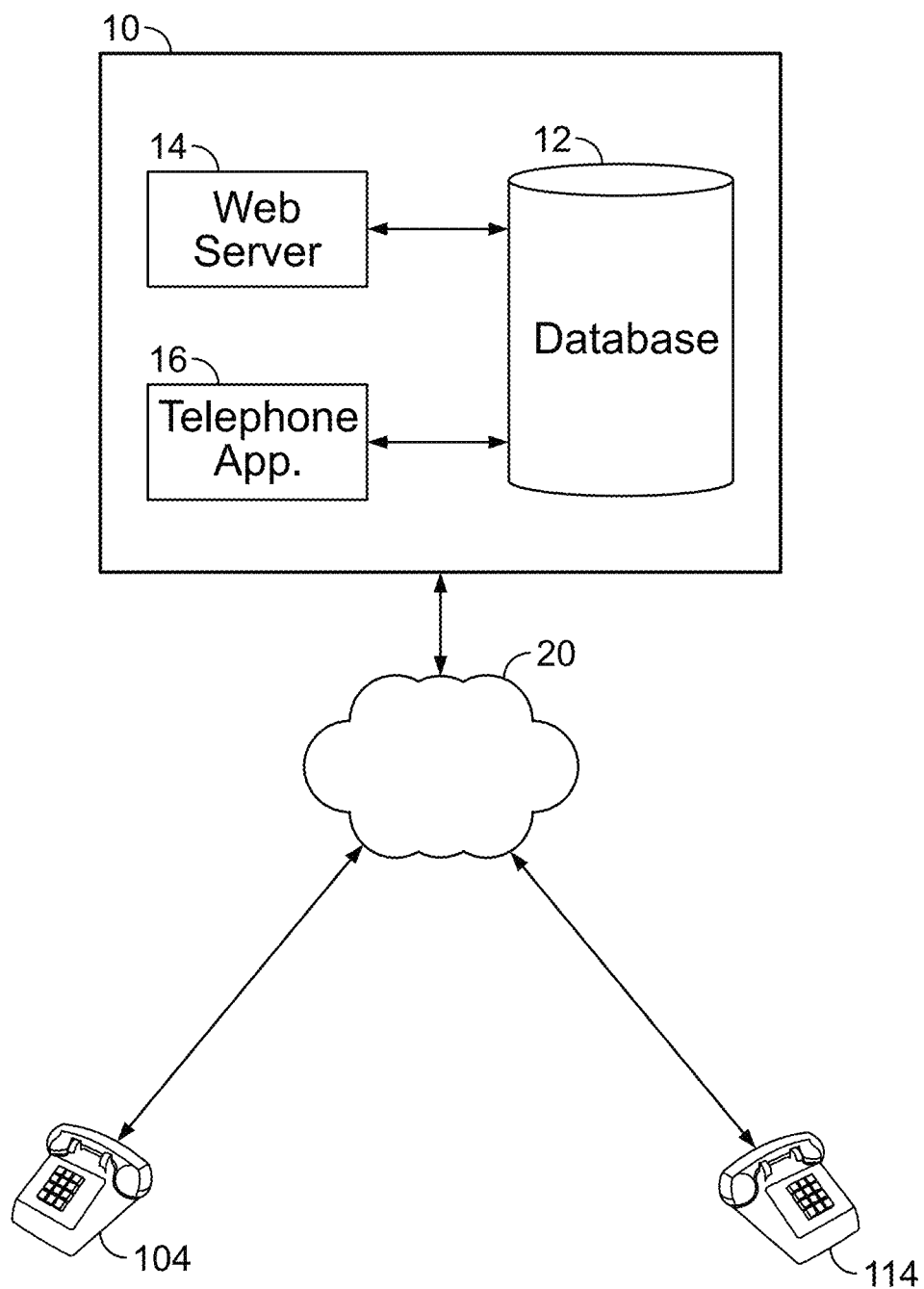
FIG. 4 illustrates a second embodiment of the present invention, in which a host device communicates with a second client device and a second advisor device over a network.

The flexibility of the present invention can be seen in FIG. 3. As discussed above, a client may communicate with the host device 10 via a personal computer 102. This may be done, for example, by logging into a website (e.g., using user name and password) and requesting a communication with an advisor. The advisor may also communicate with the host device 10 via a personal computer 112. For example, the advisor may log into the website to provide the host device 10 with the advisor's availability, to check/accept/acknowledge scheduled/requested communications, etc. A personal computer (e.g., 102, 112) can also be used to provide the host device 10 with a user's contact information (e.g., callback number, email address, etc.). The contact information may be used to notify the user of a scheduled/accepted communication and to contact the user at the date/time for the scheduled communication. For example, as shown in FIG. 4, the host device 10, or more particularly the telephone application 16 operating on the host device 10, may be configured to use the client's telephone number to place a call to the client device 104 (e.g., cordless phone, cellular phone, smartphone, etc.), and use the advisor's telephone number to place a call to the advisor device 114 (e.g., cordless phone, cellular phone, smartphone, etc.). Once the telephone application 16 has an open communication line with the client device 104 and an open communication line with the advisor device 114, the application 16 can connect (or join) the two, allowing the client and the advisor to participate in the scheduled communication.

It should be appreciated that the present invention is not limited to situations where the client and the advisor are communicating with the host device 10 or one another via personal computers or telephones, as illustrated in FIGS. 3 and 4. As discussed above, because the host device 10 is involved in the scheduling, establishing, and maintaining the communication, different users can use different devices, or different communication methods. For example, mobile devices, such as smartphones, can use cellular telephone frequencies to place and receive telephone calls. Because these devices are intelligent (i.e., smart), they can also be used to send and receive text messages, send and receive emails, and load and interact with websites. And because these devices are programmable, they also support software known as mobile applications. In one embodiment of the present invention, at least one mobile application is used (i.e., downloaded, opened, logged into, etc.) to establish an open communication channel between the user device and the host device. In one embodiment of the present invention, the mobile application (or a first version thereof) can be used by the client to request a communication with a particular advisor, receive notifications and/or reminders of communications, and participate in communications. In another embodiment of the present invention, the mobile application (or a second version thereof) can be used by the advisor to provide the host device with the advisor's availability, view the advisor's schedule (e.g., scheduled communications, etc.), accept/decline requests for communications, and participate in communications.

Figure 4B:
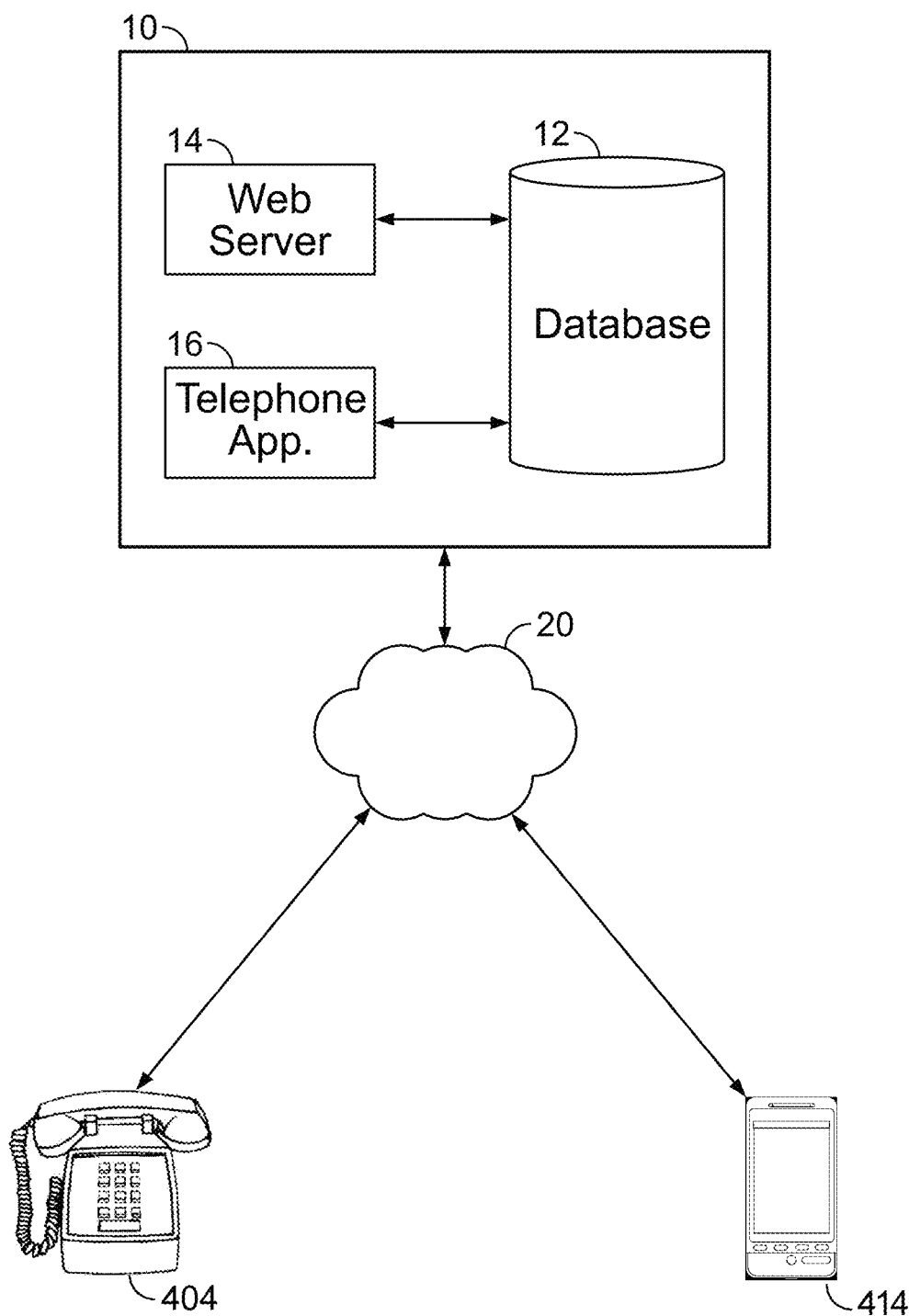
FIG. 4B illustrates a third embodiment of the present invention, in which a host device communicates with the second client device (see FIG. 4) and a third advisor device over at least one network.

Because of the open communication channel between the user device and the host device, the mobile application can be used to provide information to the host device (e.g., requesting a communication, accepting a request, etc.) similar to the way in which information is provided (or uploaded) to a website using a personal computer. However, the mobile application can also be used to provide (or download) information to the user (e.g., providing the advisor with a communication request, reminding a user of a scheduled communication, etc.). This can be done by using a push notification service or by opening the application, which may require logging into the application, and using a pull notification service. And if the mobile application is so configured, it can be used to place and receive telephone calls (e.g., using voice over Internet protocol (VoIP), session initiation protocol (SIP), etc.). Thus, the flexibility of the present invention allows different users to use different devices (see, e.g., FIG. 4B, showing a host device being used to facilitate a communication between a first device (i.e., landline telephone) and a second device (i.e., smartphone)). It also allows different users to use different communication methods, regardless of the devices being used. For example, a client could send a message to an advisor via the website, and the host device could reformat the communication, and provide it to the advisor via text messaging or via the mobile application (e.g., using push notification, pull notification, etc.).

Figure 8:
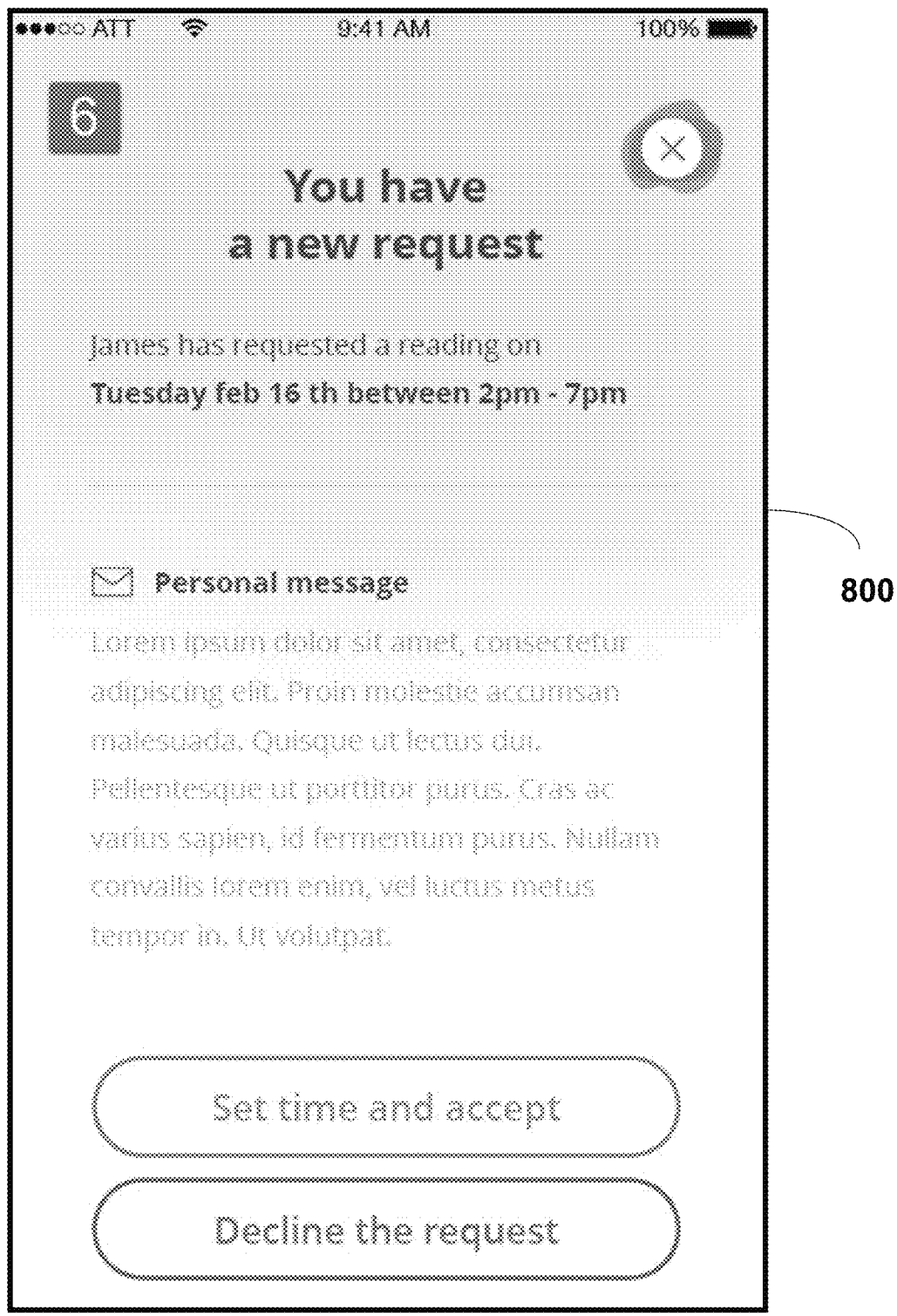
FIG. 8 shows an exemplary output of an application operating on an advisor device, notifying the advisor of the requested communication.
Figure 9:
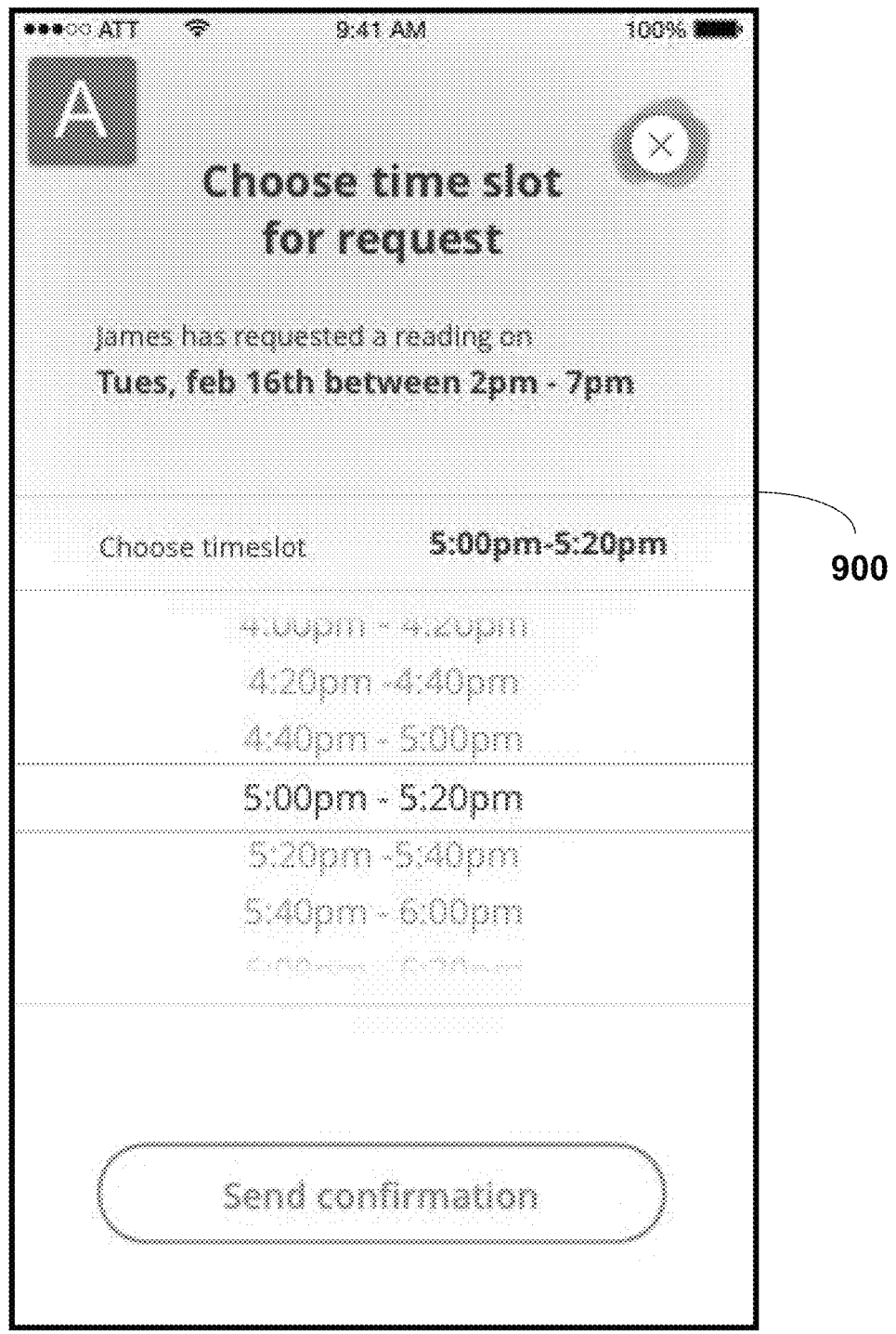
FIG. 9 shows an exemplary output of the application operating on the advisor device, allowing the advisor to select a date/time for the communication with the client.

By way of example, FIG. 8 shows how a mobile application operating on a mobile device (e.g., smartphone, etc.) can be used to provide a communication request to an advisor. In this example, the request is from James, requesting a reading on the afternoon of February 16th (note, the afternoon request has been converted into a time range representing the same, i.e., between 2:00 and 7:00 P.M.). In this example, the output 800 of the mobile application not only provides information to the advisor (i.e., the requested communication), but allows the advisor to provide information to the host device (i.e., accepting or denying the requested communication). By interacting with (e.g., clicking on) the "decline the request" feature, the host device will be notified that the requested communication has been declined. Alternatively, by interacting with the "accept" feature, the host device will be notified that the requested communication has been accepted. If the request is a time range (see FIG. 8), then a second output 900 (see FIG. 9) may be provided to the advisor, allowing the advisor to select a time slot from within the time range. The advisor would then interacting with the "send confirmation" feature, notifying the host device of the particular time slot confirmed by the advisor.

Figure 10:
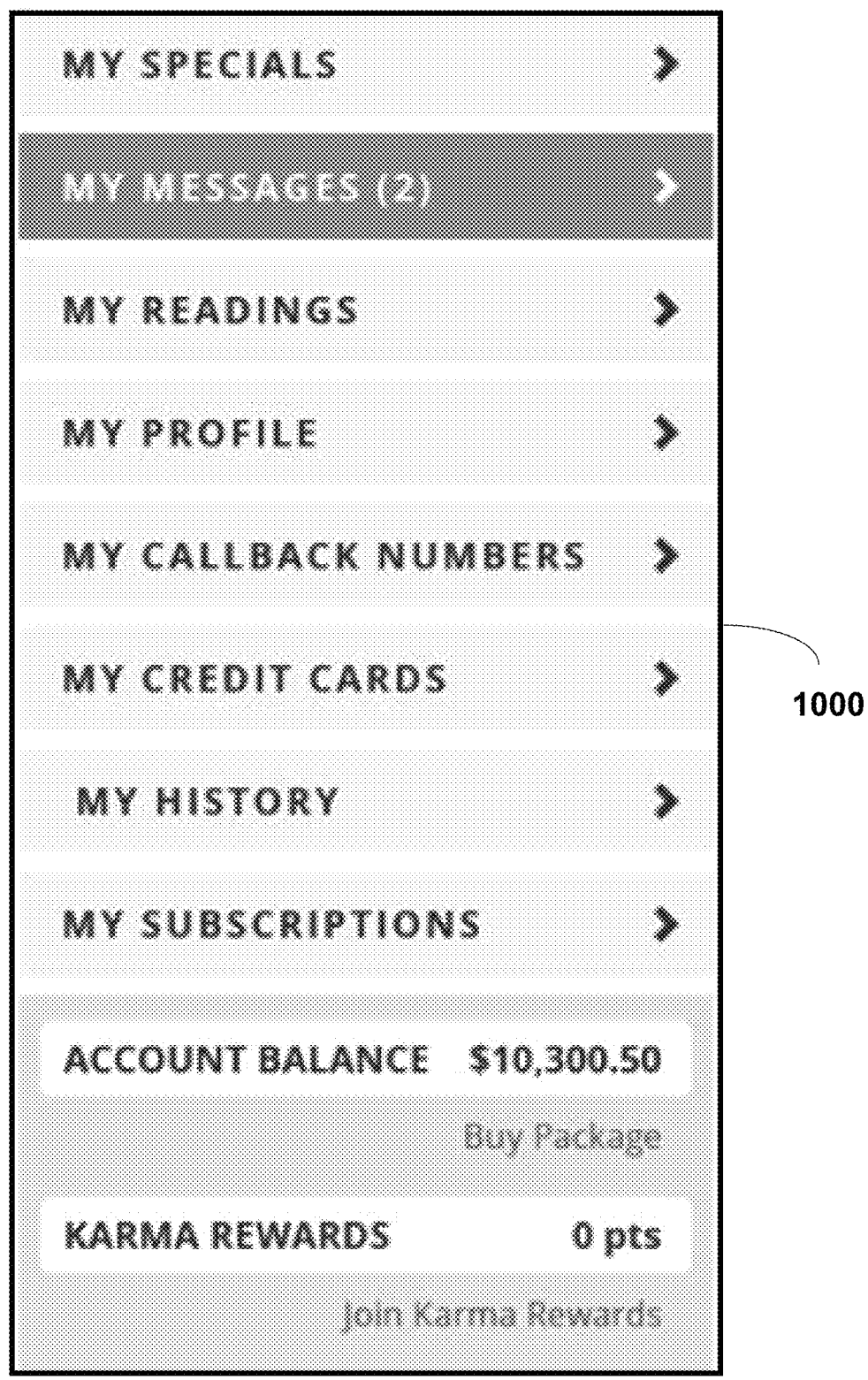
FIG. 10 shows an exemplary web page providing client account information, including messages for the client.
Figure 11:
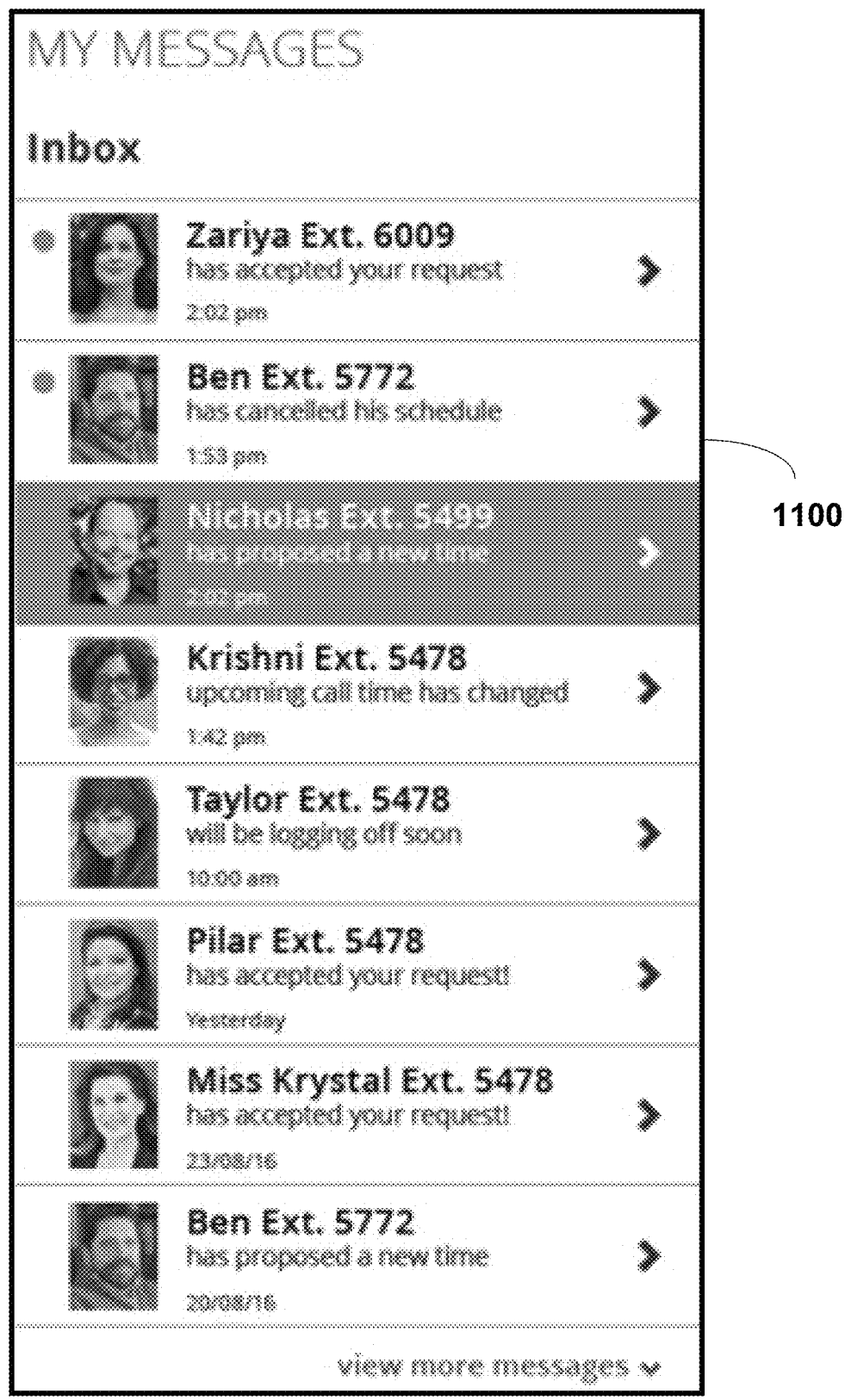
FIG. 11 shows an exemplary web page depicting a plurality of messages received from a plurality of advisors.
Figure 12:
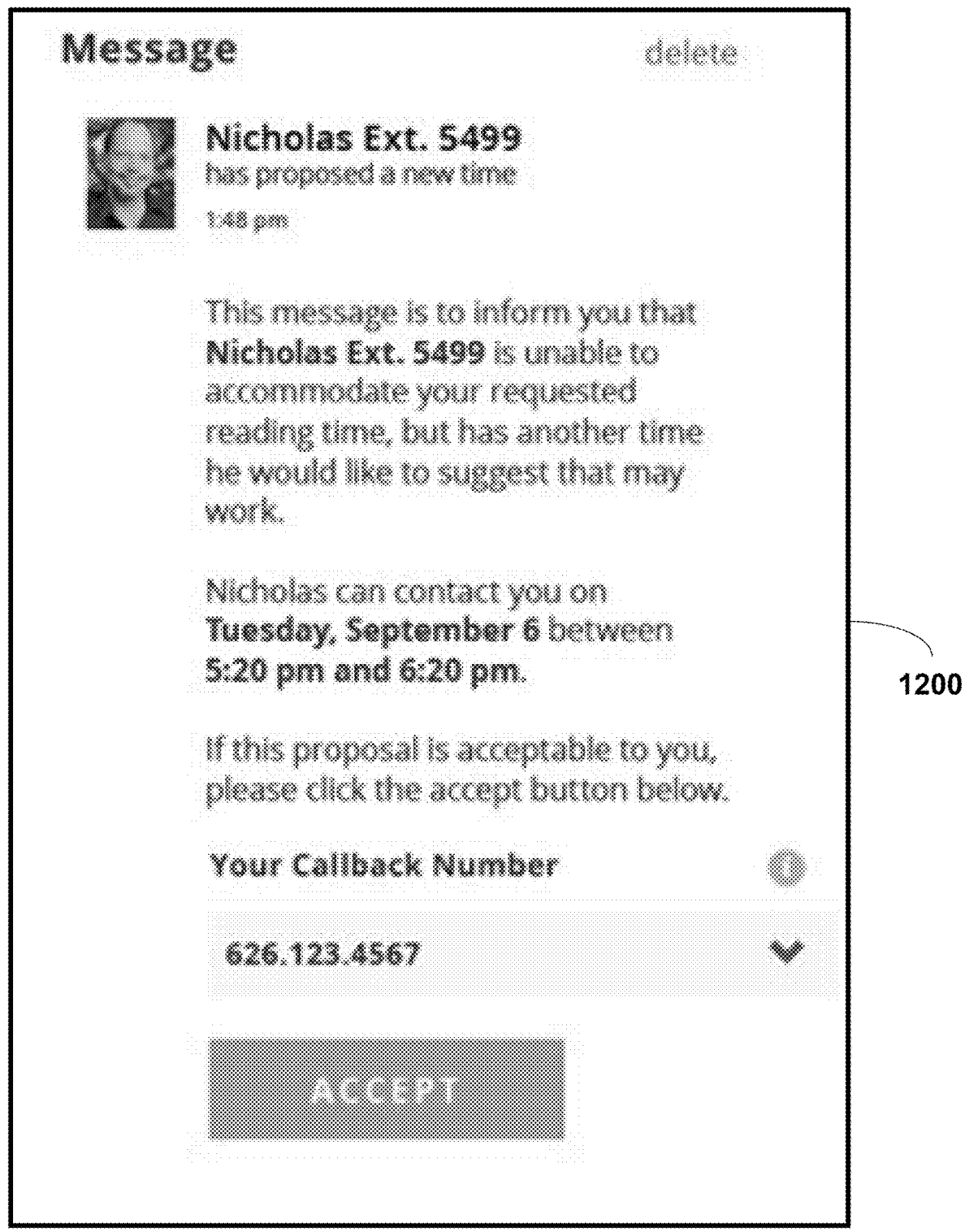
FIG. 12 shows an exemplary web page depicting a message received from a particular advisor, proposing a new time for the communication.

The host device may then notify the client of the advisor's declination, acceptance, or confirmation of a new (or more specific) time slot. This notification could be carried out via a mobile application operating on the client's mobile device (e.g., using push notification, pull notification, etc.), email, text messaging, or a client account web page. By way of example, FIG. 10 shows such a web page 1000, which the client may access by logging into the host device's website. Such a web page 1000 could be used to provide the client with and/or allow the client to edit client account information, including, but not limited to, messages (e.g., messages from the host or system, messages from advisors, etc.), upcoming readings, client profile information, at least one client call back number, payment information (e.g., a credit card, a debit card, PayPal™ account information, etc.), previous readings, subscriptions, account balance, and/or rewards. The client can then interact with a specific topic to receive and/or provide information on that topic. For example, if the client interacts with the "messages" feature, the client may be provided with a different web page 1100 (see FIG. 11), showing messages received from various advisors (e.g., declining a request, accepting a request, providing a counter-request, etc.). Similarly, if the client interacts with a particular message, the client may be provide with a different web page 1200 (see FIG. 12), providing the client with the entire message and/or allowing the client to respond to the message. As with the client, notifications that are provide to the host device from the client can be provided to the advisor via the mobile application, email, text messaging, and/or an advisor account web page.

Figure 13:
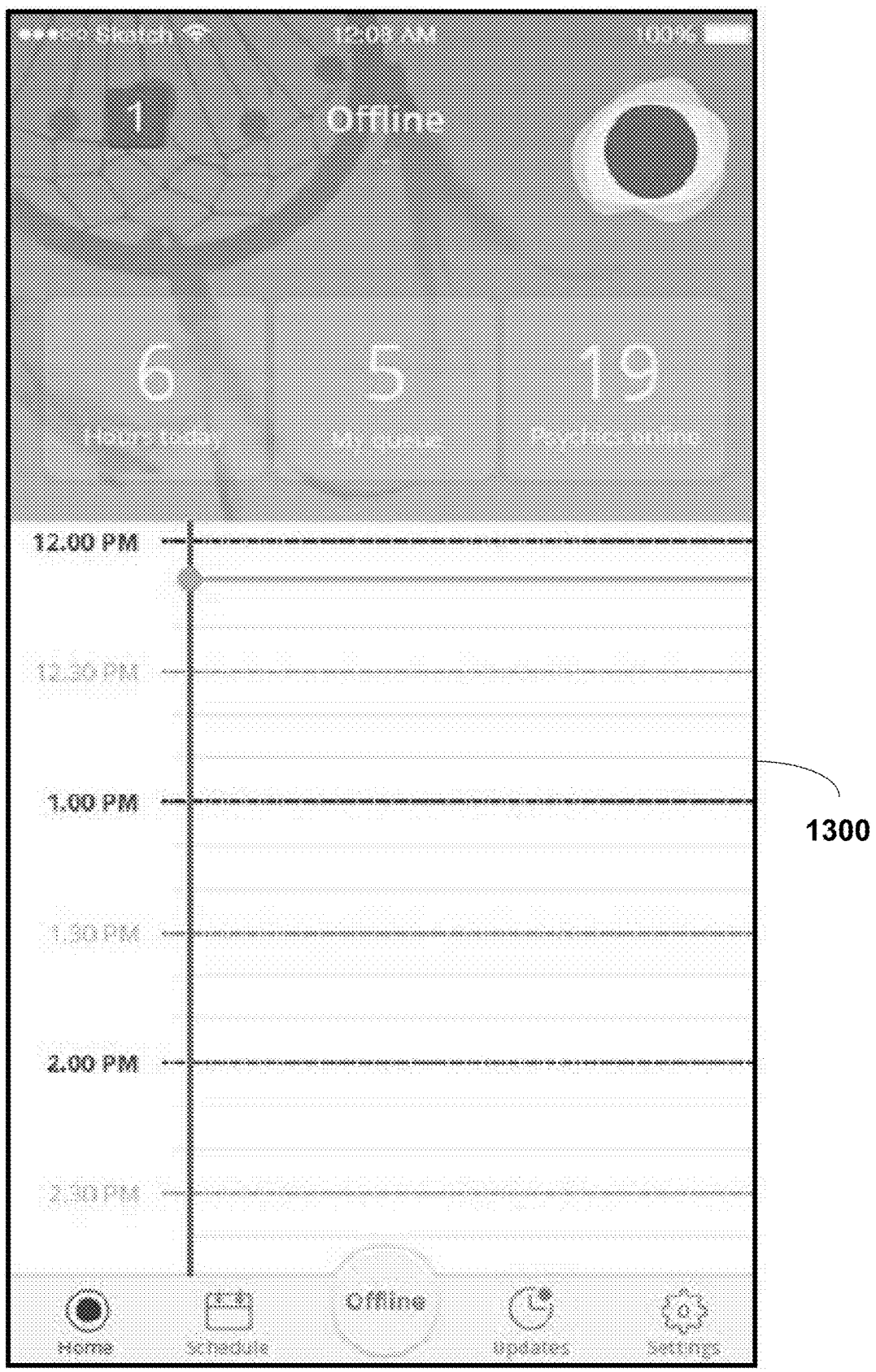
FIG. 13 shows an exemplary output of the application operating on the advisor device when the application is offline.
Figure 14:
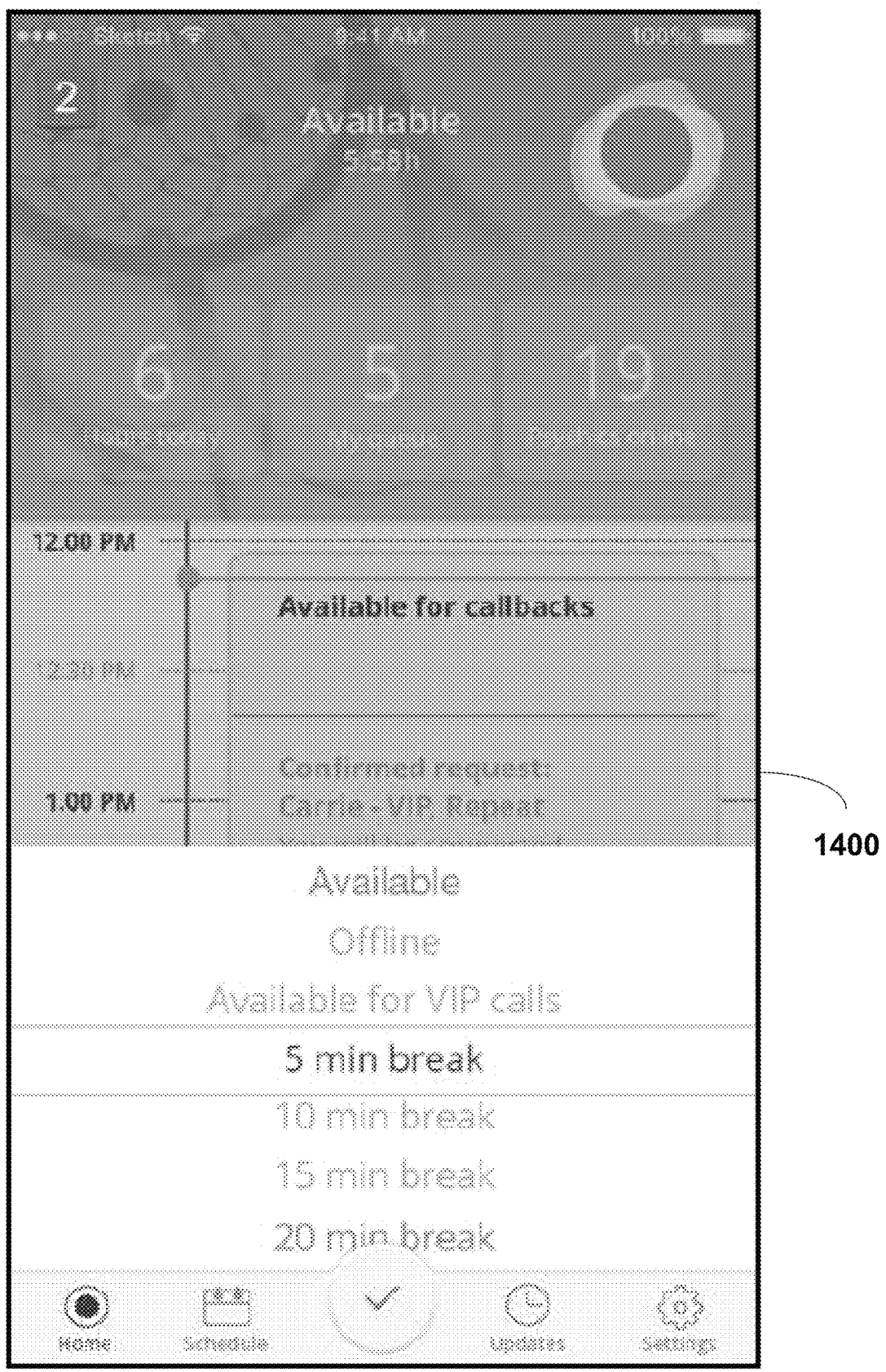
FIG. 14 shows an exemplary output of the application operating on the advisor device when the application is online (i.e., the state of the application has been changed from offline to online)

Exemplary outputs of a mobile application are shown in FIGS. 13-18. For example, FIG. 13 shows an output 1300 of what an advisor may see after opening and/or logging into the application. FIG. 13 show the application in an "offline" state (i.e., the application cannot be used to participate in communications). In other words, even though the advisor has opened and/or logged into the application, the application is seen by the host as being "offline" or "unavailable." In this state, the advisor will not be able to use the application to participate in communications. FIG. 14 shows an output 1400 of what an advisor may see after changing the application's state to "online" or "available." In this state, the host will see the application as available, and the advisor will be able to use the application to participate in communications. As shown in FIG. 14, regardless of the application's state (i.e., "online" or "offline"), the advisor may able to use the application to view his schedule for the day, update or change his schedule, view updates, change settings, etc.

In one embodiment of the present invention, once the advisor has changes the application's state to "online" (indicated by the check mark in FIG. 14), the host device may verify the call quality of the application, or interact with the application to determine whether the communication channel between the application and the host device can support (i.e., be used to participate in) the communication. While the client may be held responsible for providing a callback number, and ensuring that they have sufficient coverage (if using a cellular telephone) to participate in the communication, the aforementioned verification may be performed in order to ensure the call quality of the application. In other words, verification is performed in order to ensure that the application, which is operating on the advisor device, has sufficient bandwidth and/or coverage to support VoIP, SIP, or whatever protocol is being used by the application and/or the host device to support voice calls over the Internet.

Figure 15:
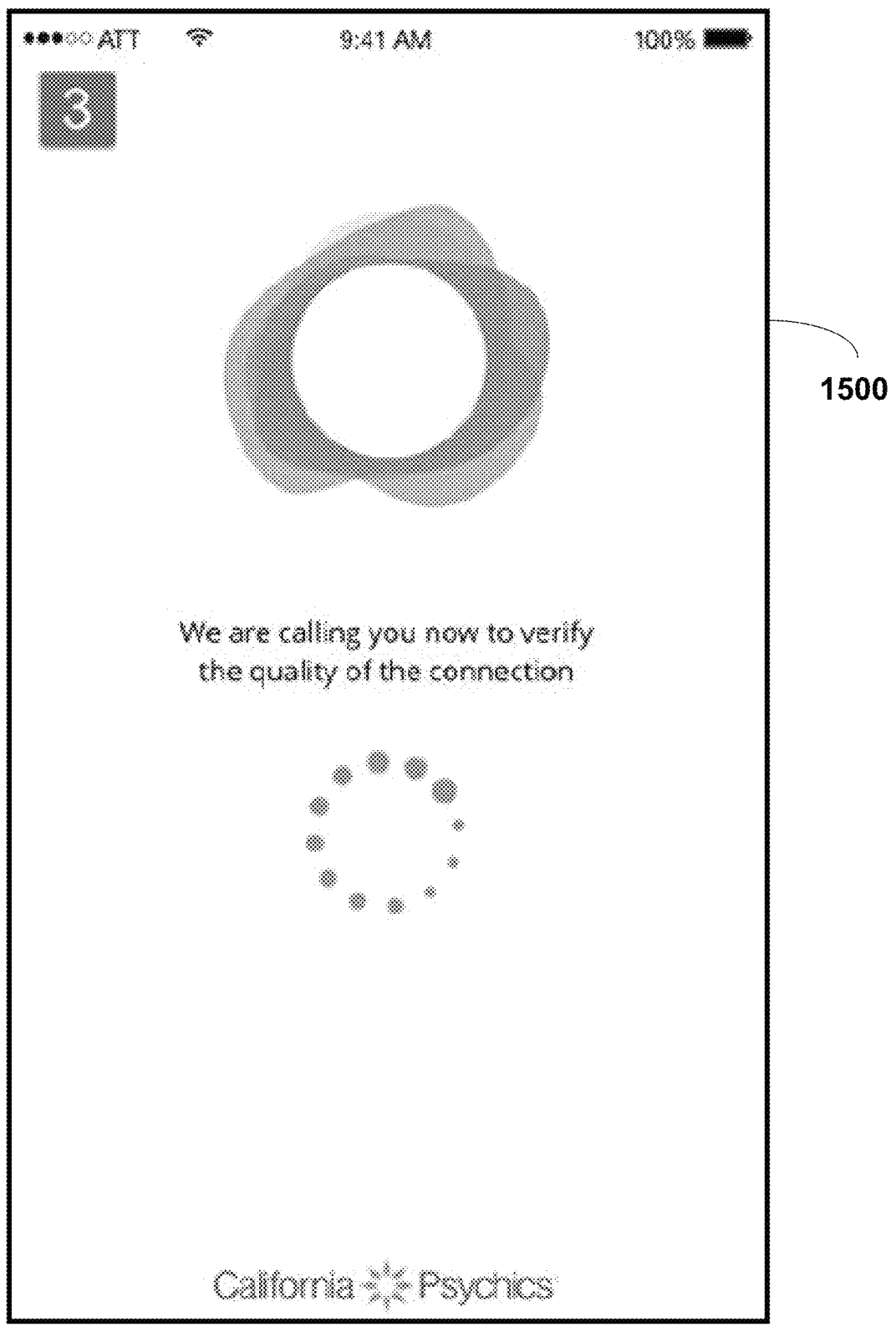
FIG. 15 shows an exemplary output of the application operating on the advisor device, notifying the advisor that the host device will now verify the quality of the connection between the host device and the application, ensuring that the application can be used to participate in the communication with the client.
Figure 16:
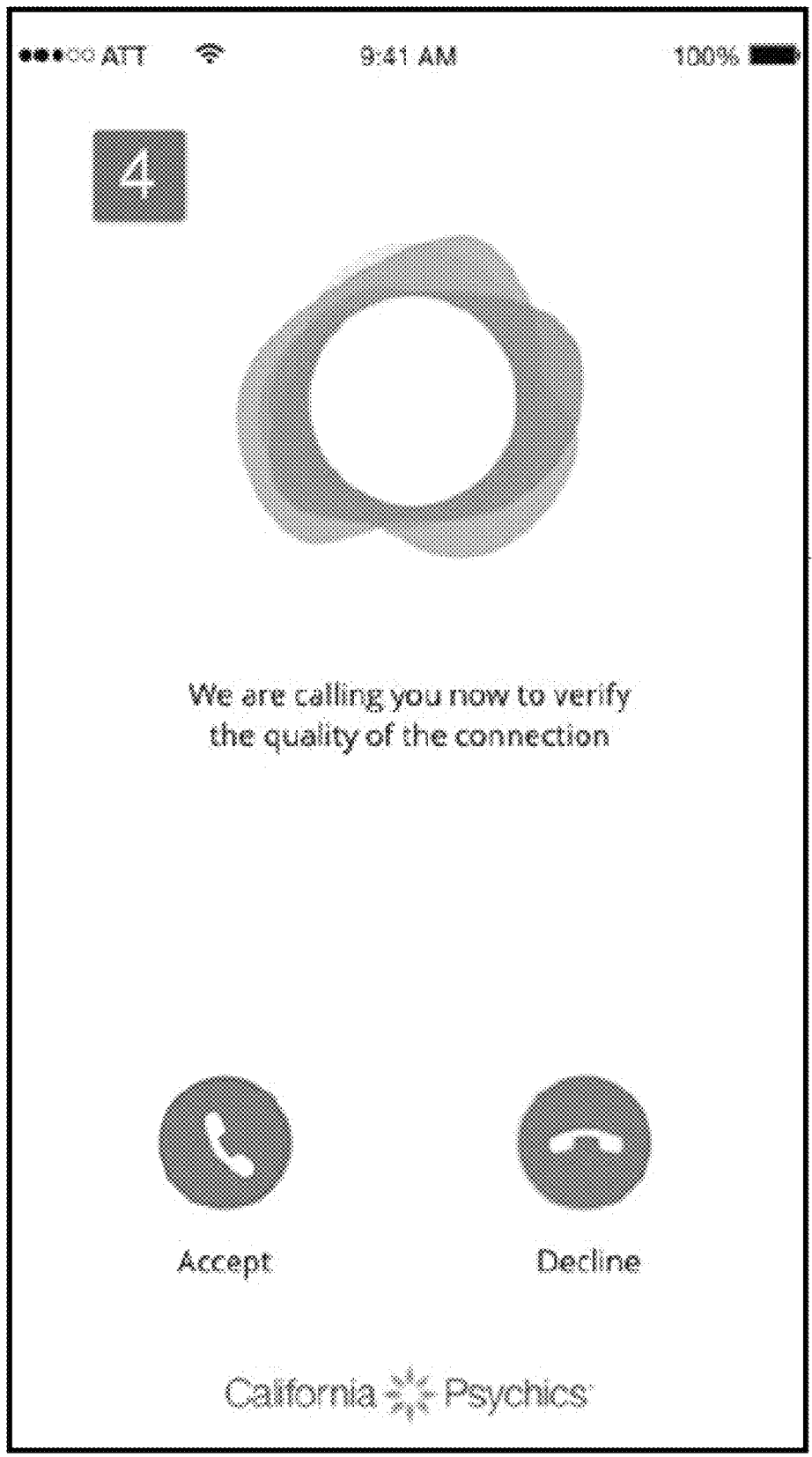
FIG. 16 shows an exemplary output of the application operating on the advisor device, notifying the advisor that the host device is calling to verify the quality of the connection between the host device and the application.
Figure 17:
FIG. 17 shows an exemplary output of the application operating on the advisor device, requesting the advisor to enter certain information to verify the quality of the connection between the host device and the application.
Figure 18:
FIG. 18 shows an exemplary output of the application operating on the advisor device, notifying the advisor that the call quality has been verified and the application will be used by the advisor to participate in the communication with the client.

Verification is performed by having the host device call the mobile application. As shown in FIG. 15, this may result in the application generating an output 1500, notifying the advisor that the host device is calling the application. As shown in FIG. 16, the application may allow the advisor to either accept or decline the telephone call. If the advisor declines the call, or fails to accept the call, then the application (or its call quality) may be registered as unverified (e.g., storing information in the database 12 that the application is not verified), or alternatively not registered as verified (e.g., not changing the status of the application in the database 12 to verified). This status will remain until the application (or call quality) has been verified. If the advisor accepts the call, the telephone application (e.g., 16) operating on the host device (e.g., 10) will verbally instruct the advisor (e.g., using speech generating software) that the purpose of the call is to verify the advisor device (e.g., 414), or the mobile application operating thereon, and/or to enter verification data (e.g., using the telephone keypad, voice command(s), etc.). As shown in FIG. 17, the host device may instruct the advisor to press any key, or alternatively instruct the advisor to press a particular key or sequence of keys (e.g., press 1 to verify, press 1, 2, 3, 4 to verify, etc.). If the advisor enters data, the host device may verify or confirm that the entered data is indeed the verification data. If the advisor enters the verification data, it is assumed that the connection between the mobile application and the host device is sufficient to allow the advisor to use the mobile application to participate in a telephone call with a client. As shown in FIG. 18, the host device may notify the advisor that the verification was successful, store information in the database (e.g., 12) that the advisor device (e.g., 414), or call quality of the application, has been verified, and terminate (or allow the application to terminate) the telephone call.

Figure 19:
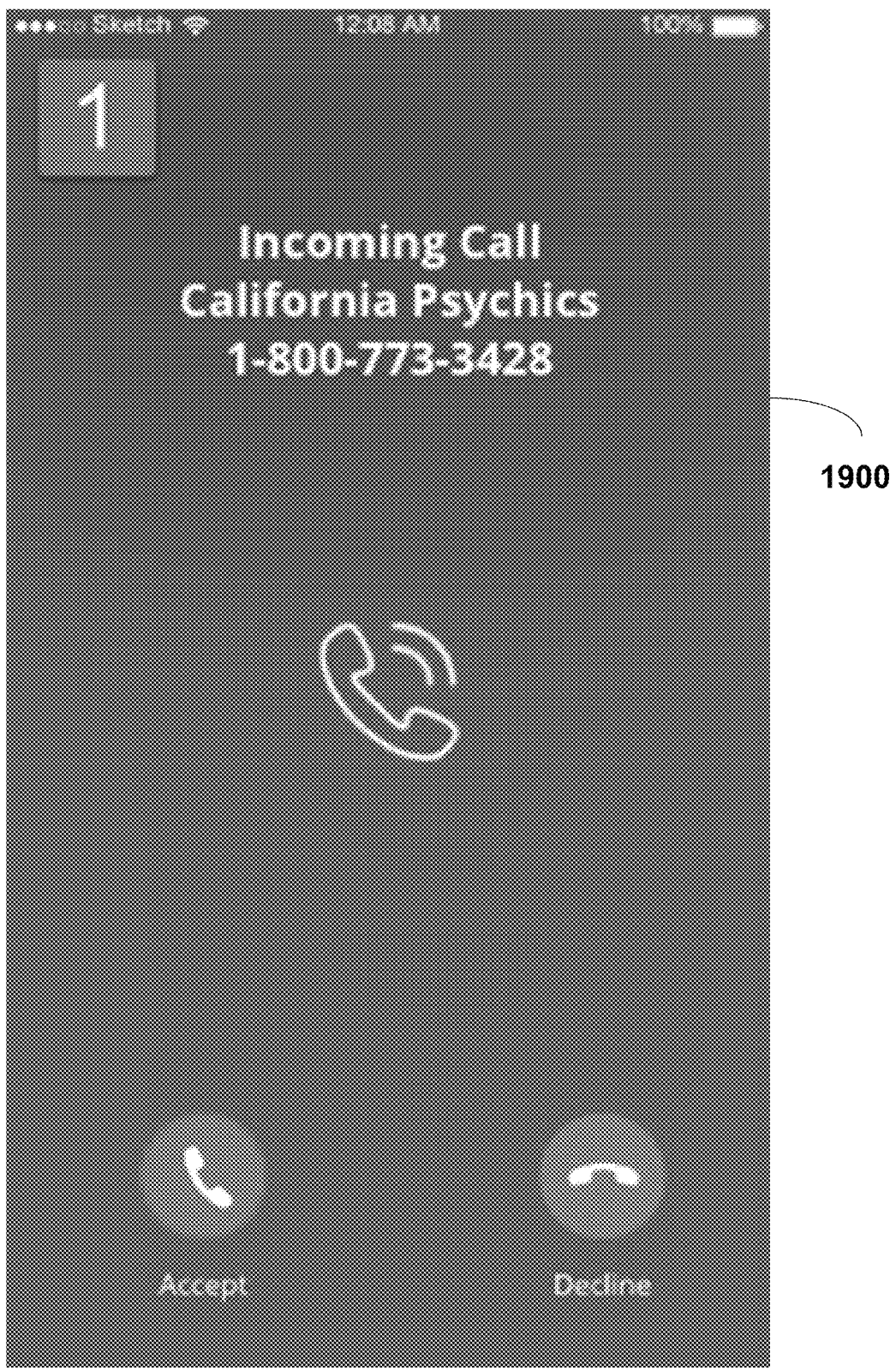
FIG. 19 shows an exemplary output of the application operating on the advisor device, indicating an incoming call from the host device.
Figure 20:
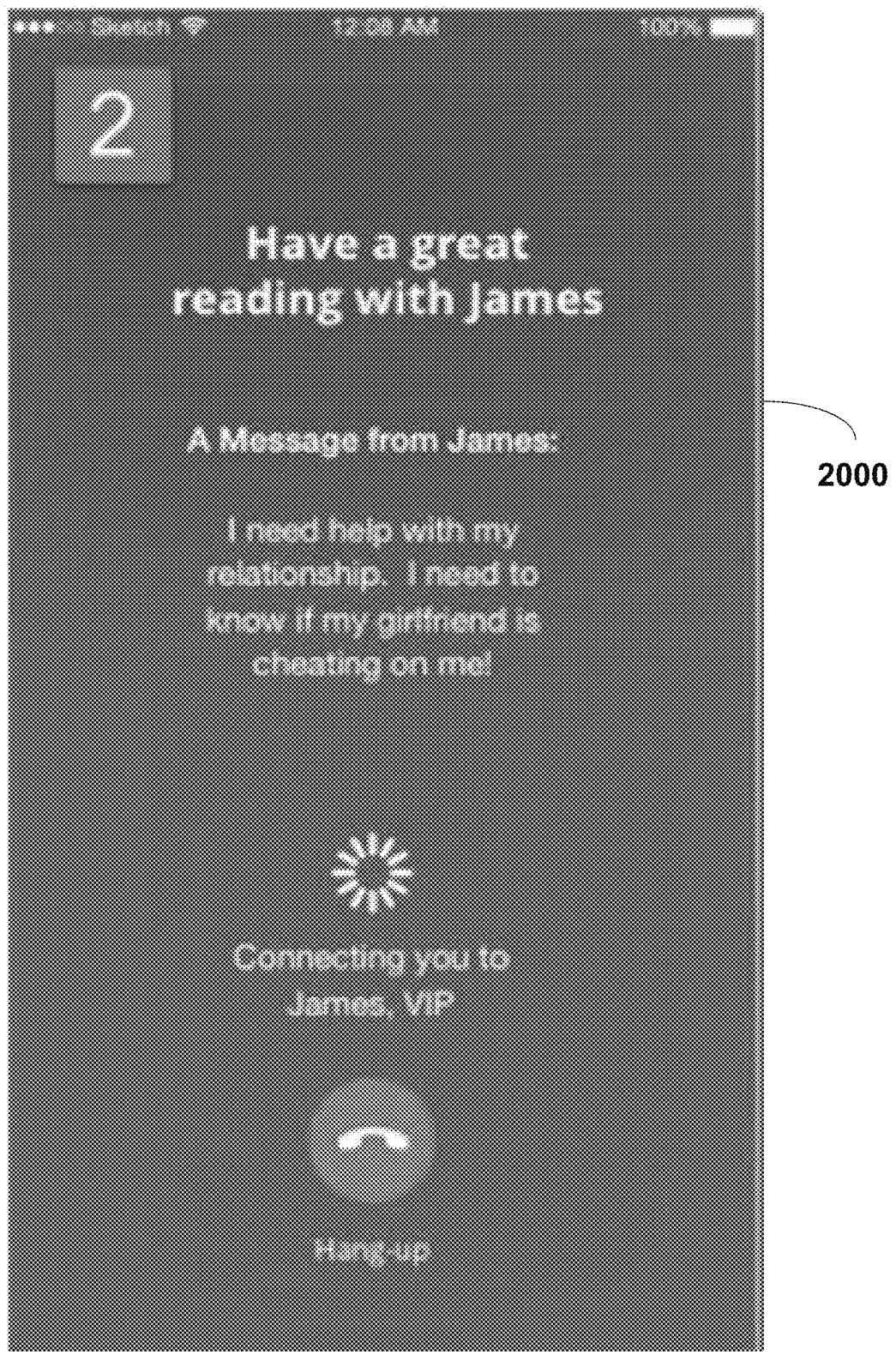
FIG. 20 shows a first exemplary output of the application operating on the advisor device, indicating that the host device is attempting to connect the advisor to the client.
Figure 21:
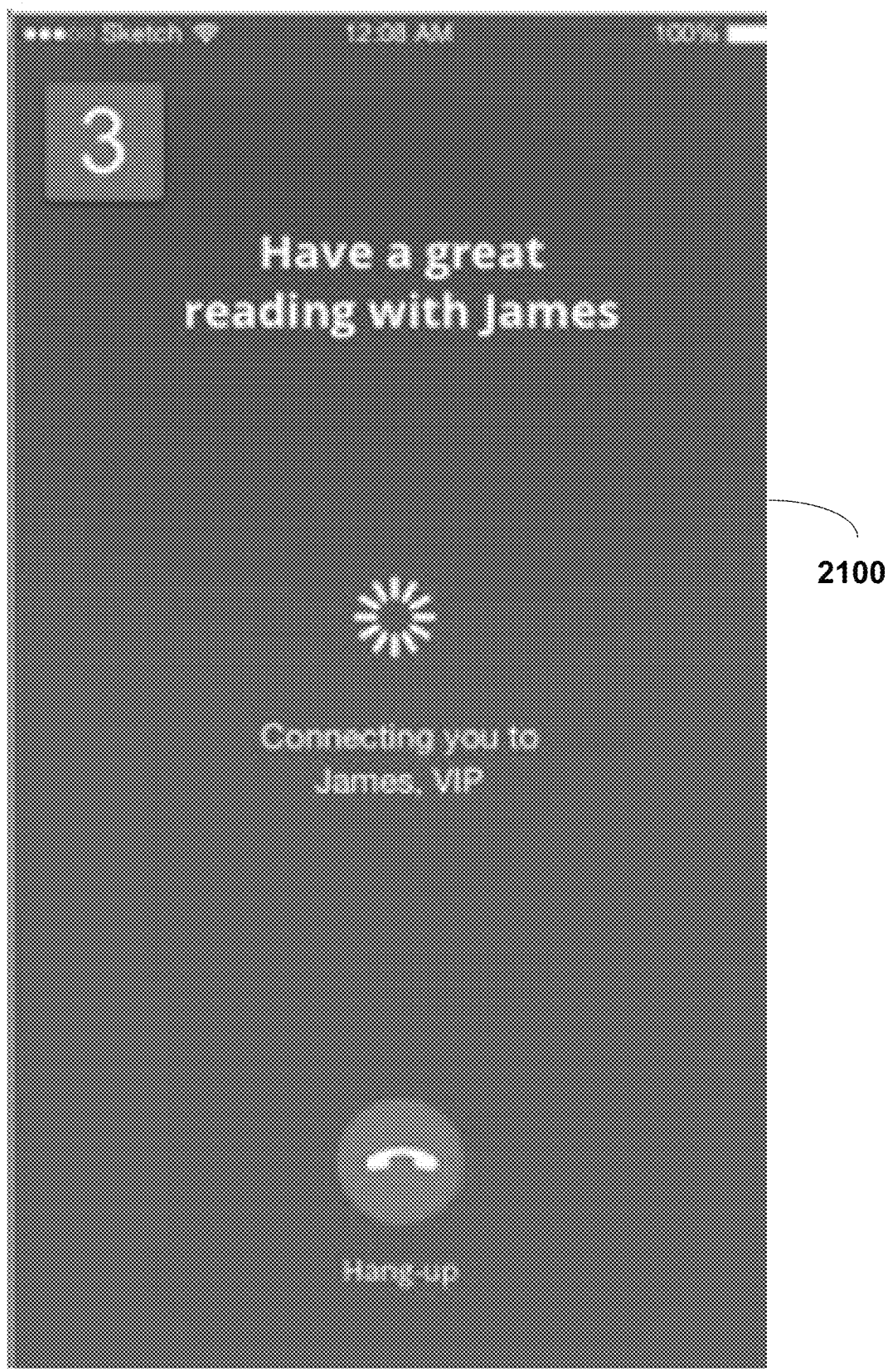
FIG. 21 is a second exemplary output of the application operating on the advisor device, indicating that the host device is attempting to connect the advisor to the client.

If a client requests a telephone call with an advisor at a particular date/time, and the request is accepted by the advisor, then the host system will store the date/time for the communication in the database (e.g., 12). At the stored date/time (or shortly before), the host device will place a call to the mobile application operating on the advisor device if the mobile application has been verified (see FIG. 19). If the mobile application has not been verified, the host device will attempt to reach the advisor using previously stored information (e.g., a callback number associated with the advisor's cellular telephone, smartphone, landline phone, etc.). Once the advisor answers (or before the advisor answers, depending on the order calls are placed), the host device will place a call to the client using callback information previously provided by the client (see, e.g., FIG. 10). While the host device is calling the client, the advisor may see information on the client, such as the client's name (see FIG. 21), a message from the client (see FIG. 20), etc. In other words, by allowing the advisor to use the mobile application to participate in the communication with the client, the advisor can not only use the application to communicate verbally with the client, but can also receive textual information from the host device concerning the communication (e.g., a message from the client, information about the client, etc.). This results in an enhanced communication experience for the advisor and/or the client.

It should be appreciated that the web pages and application outputs shown in FIG. 5-21 are exemplary in nature, and merely depict how the present invention may operate, not how the present invention must operate. Thus, web pages that present other or different information to the advisor and/or client are within the spirit and scope of the present invention. For example, the client may use the website to review and/or edit account information, search for a particular advisor, schedule a communication with an advisor, etc. By way of another example, the advisor may use the website to review and/or edit account information, review, edit, and/or upload their availability or schedule (e.g., view scheduled communications, upload their availability to participate in communications with clients, etc.), etc. Further, a mobile application that is configured to provide other or different outputs to the advisor and/or client are within the spirit and scope of the present invention. For example, the mobile application may be configured to function similarly to the website, e.g., allowing an advisor to review, edit, and/or upload their availability or schedule, allowing a client to review and/or edit account information, allowing a client to search for a particular advisor, allowing a client to schedule a communication with an advisor, allowing a client to participate in a communication with an advisor, etc.

Figure 4C:
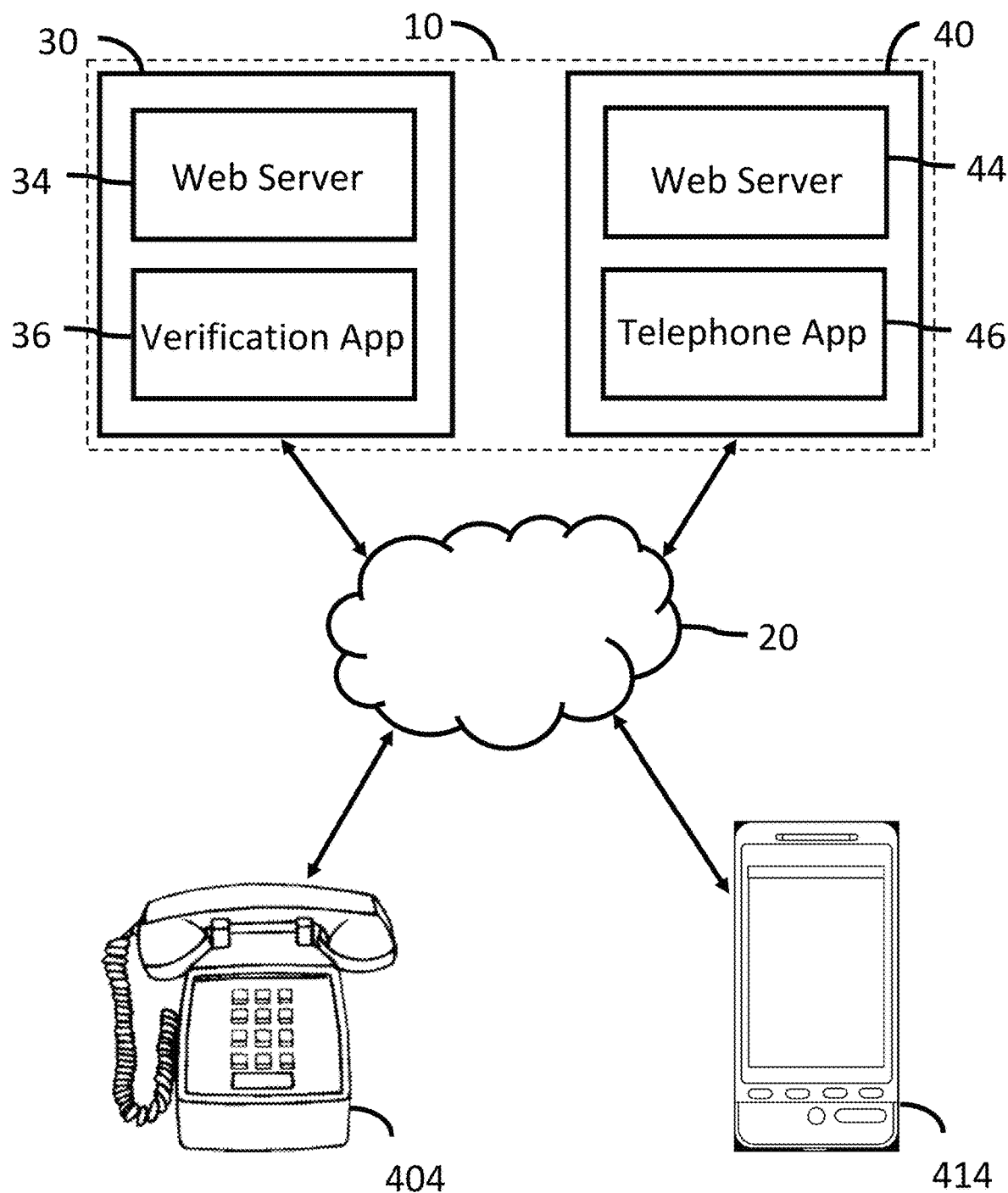
FIG. 4C illustrates a fourth embodiment of the present invention, in which a plurality of host devices communicate with the second client device (see FIG. 4) and the third advisor device (see FIG. 4B) over at least one network.

In one embodiment of the present invention, as shown in FIG. 4B, the host device 10 is configured to schedule, establish, and maintain a communication between a client device 404 and an advisor device 414. In this embodiment, the telephone application 16 operating on the host device 10 may be configured to both verify the call quality of the mobile application operating on the advisor device 414 and to establish and maintain a communication between the client device 404 and the advisor device 414. In an alternate embodiment of the present invention, as shown in FIG. 4C, the host device 10 includes a first host device 30 and a second host device 40, where the first host device 30 includes a verification application 36 for verifying the call quality of the mobile application operating on the advisor device 414 (as previously discussed), and the second host device 40 includes a telephone application 46 for establishing and maintaining a communication between the client device 404 and the advisor device 414 (as previously discussed).

By using multiple host devices, certain functions, such as establishing and maintaining at least one communication between at least one client and at least one advisor, can be offloaded to the second host device 40, which may be operated by a third party. In doing so, the first host device 30 may transmit information on the communication to the second host device 40 via a WAN (e.g., the Internet), including information that would allow the telephone application 46 to call the client device 404 and the mobile application operating on the mobile device 414 at the appropriate date/time. This may include data on the client (e.g., client name, account number, user ID, phone number, etc.), data on the advisor (e.g., advisor name, mobile application ID, etc.), and data on the scheduled communication (e.g., date, time, estimated duration, communication ID, etc.). After the communication, the second host device 40 may than transmit information on the communication to the first host device 30 via the WAN (e.g., the Internet), including information identifying the communication (e.g., client name, account number, or phone number, advisor name or mobile application ID, communication ID, etc.) and the length of the communication (e.g., start time, end time, duration, etc.). This would allow the first host device 30 to offload the functions of establishing and maintaining the communication to the second host device 40, while maintaining records concerning the communication, such as the duration of the communication for billing purposes.

Figure 22:
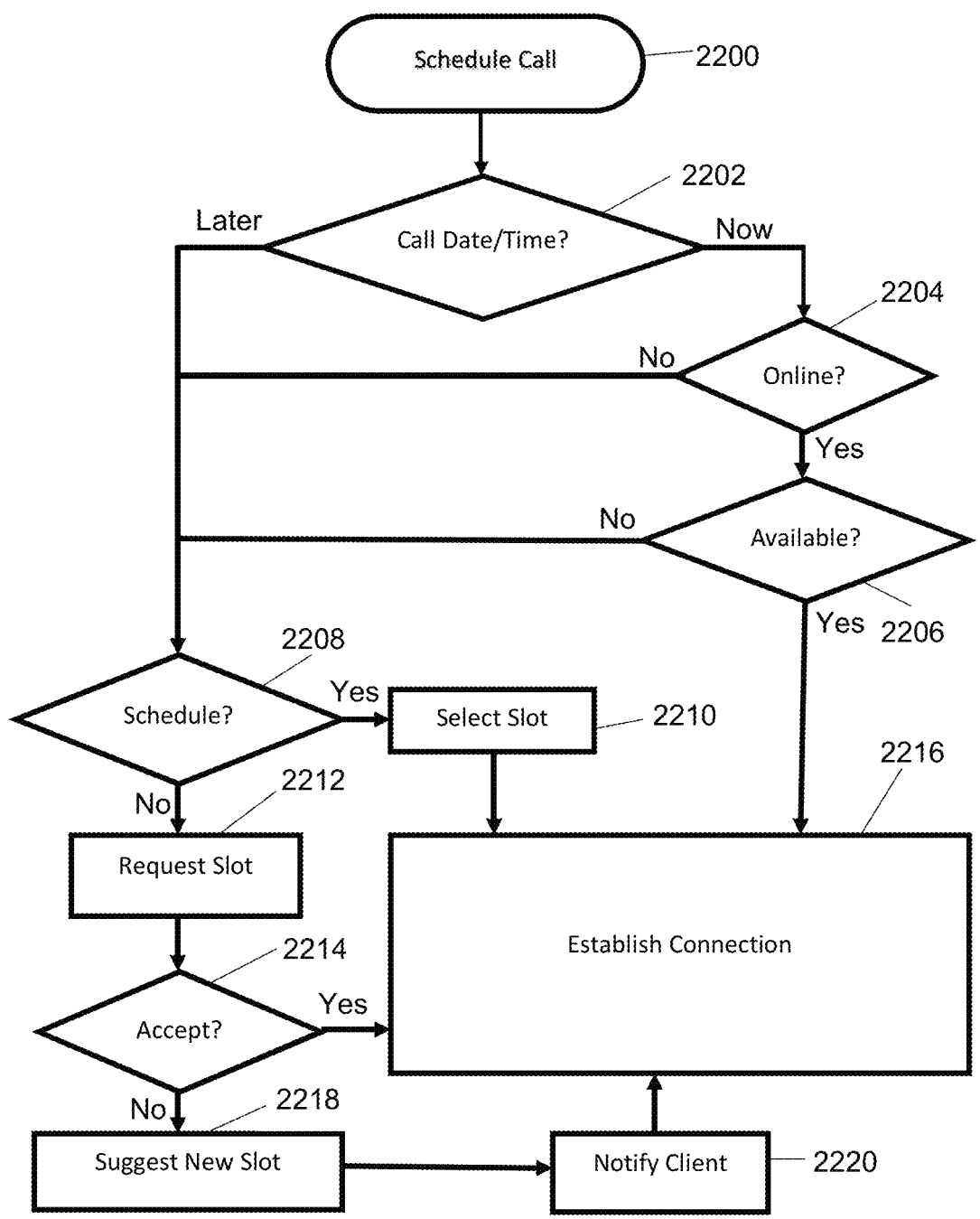
FIG. 22 illustrate a method for scheduling the communication between the client and the advisor in accordance with one embodiment of the present invention.

A method for scheduling a communication with an advisor in accordance with one embodiment of the present invention is illustrated in FIG. 22. Starting at step 2200, a client informs the host (e.g., website, etc.) of their desire to schedule a communication, such as a telephone call with a particular advisor. A decision is then made at step 2202 as to whether the communication will take place now or at a later time (e.g., later today, another day, etc.). If the client chooses "Now," then a determination is made as to whether the client in online at step 2204. This determination may include whether the advisor device, or the call quality of the mobile application operating thereon is verified. If the advisor is online, a determination is made as to whether the advisor is available (e.g., is not currently participating in another communication, does not have another communication scheduled that would interfere with this communication, is not on a break, etc.). This determination may be based on the advisor's current activity online or the advisor's availability (e.g., as previously provided and stored in the database). If the advisor it available, then the host device may facilitate the communication by establishing a connection between an advisor device and a client device at step 2216. This may include calling the client device (e.g., using their callback number, etc.) to establish a first connection between the host device and the client device, calling the mobile application operating on the advisor device to establish a second connection between the host device and the advisor device, and using the first and second connections to allow bi-directional communication between the advisor and the client.

If at step 2202 the client choses "Later," or if at step 2204 the advisor is not online, or if at step 2206 the advisor is not available, a determination is made as to whether the advisor has a schedule, or a list of dates/times that the advisor is available. This information may be previously provided by the advisor (e.g., via the mobile application, via the website, etc.), and may be stored in the database. If the advisor has a schedule, then the client can select and available date/time at step 2210. The host device would then facilitate that communication at the selected date/time at step 2216. If the advisor does not have a schedule, then the client may request a date/time for a communication at step 2212. The host device would then provide the request to the advisor, at which time the advisor would either accept or decline the request at step 2214. If the request is accepted, the host device would facilitate the communication at the accepted date/time at step 2216. If the request is declined, the advisor may suggest a new date/time at step 2218. This information would then be provided to the client at step 2220, and if an agreement was reached, the host device would facilitate the communication at the agreed upon date/time at step 2216.

It should be appreciated that the present invention is not limited to the method illustrates in FIG. 22, and methods for scheduling a communication that include fewer, additional, or different steps are within the spirit and scope of the present invention. For example, a selected/requested date/time (e.g., steps 2210, 2212) may require additional communications between the advisor, the client, and/or the host before the communication is stored/scheduled. For example, the stored/scheduled communication may not be the date/time selected/requested by the client. Instead, the client may merely select/request a particular range for a communication, and the advisor may be the one who selects a particular time slot within that range for the communication. In this example, it is the time slot selected by the advisor, which may or may not be confirmed by the client, that is stored/scheduled for the communication.

Figure 23:
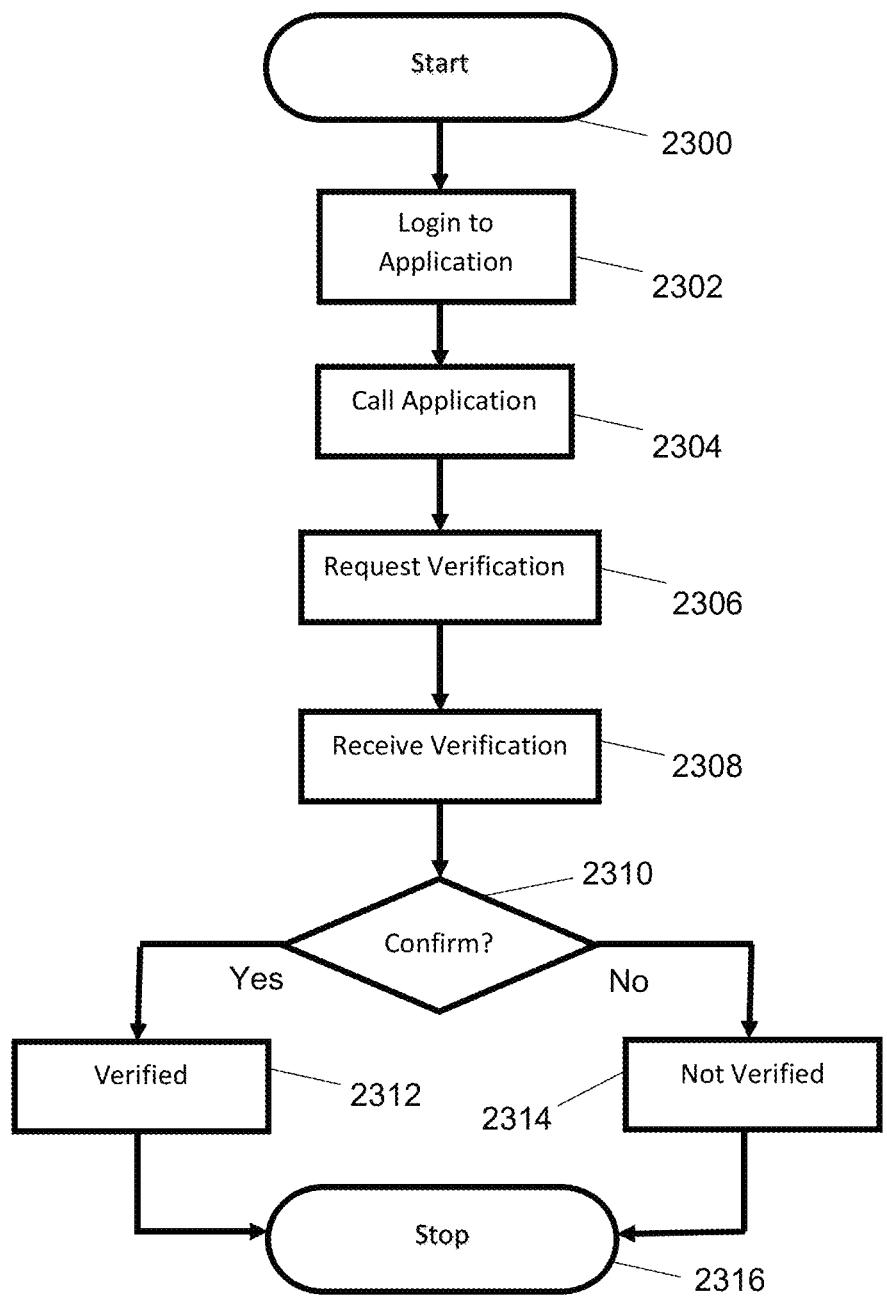
FIG. 23 illustrates a method for verifying the application in accordance with one embodiment of the present invention.

A method for verifying an advisor device (e.g., smartphone, tablet, etc.), or the call quality of a mobile application operating thereon, in accordance with one embodiment of the present invention is illustrated in FIG. 23. Starting at step 2300, an advisor may open or log into the mobile application at step 2302. In response, the host device may place a telephone call to the application at step 2304, verifying that the mobile application can be used by the advisor to participate in a communication with a client. At step 2306, the host device may provide the advisor with verbal instructions for verifying the mobile application. This may include, for example, instructing the advisor to press any key on their touchtone keypad, press a particular key (or sequence of keys) on their touchtone keypad, speak at least one command (e.g., repeat the speech being generated by the host device), etc. The data provided by the advisor is received at step 2308, and compared to actual verification data (e.g., predetermined, stored verification data) at step 2310. If the provided data does not match the stored verification data, then the mobile application is not verified at step 2314, ending the method at step 2316. This may involve storing information that the mobile application is unverified, or not storing information that the mobile application is verified. If the provide data matches the stored verification data, then the mobile application is verified at step 2312, ending the method at step 2316. This may involve storing information that the call quality of the mobile application is verified, or changing the status of the mobile application from unverified to verified.

It should be appreciated that the present invention is not limited to the method illustrates in FIG. 23, and methods for verifying an advisor device, or the call quality of a mobile application operating thereon, that include fewer, additional, or different steps are within the spirit and scope of the present invention. For example, step 2304 may not be triggered by the advisor opening or logging into the mobile application. It may be triggered, for example, by other activity, including a request from the advisor to use the application to participate in communications (e.g., changing the status of the application from offline to online), or a request from the advisor to use the application to participate in a particular communication. By way of another example, the verification requested at step 2306 may require more than the advisor entering or speaking a particular value or sequence. The whole purpose of verification is to ensure that the connection between the host device and the application is sufficient for the advisor to use the application to participate in at least one communication. Thus, the method may include more than one request for verification data (step 2306), more than one reception of verification data (step 2308), and more than one confirmation that the provided data matches the stored verification data.

Figure 24:
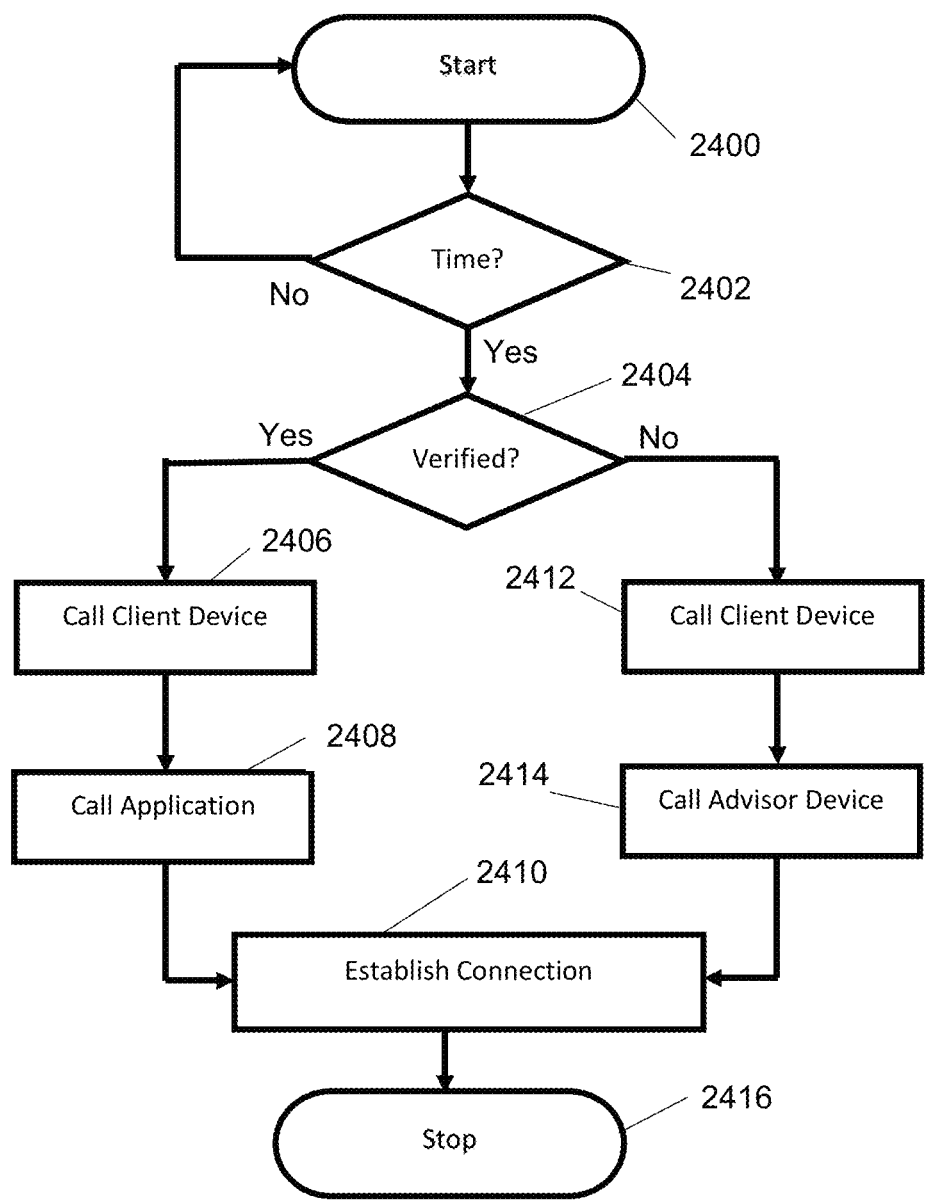
FIG. 24 illustrates a method for establishing a communication between a client and an advisor in accordance with one embodiment of the present invention.

A method for facilitating a communication between a host device and an advisor device, or a mobile application operating thereon, in accordance with one embodiment of the present invention is illustrated in FIG. 24. Starting at step 2400, a determination is made as to whether the current date/time equals or is immediately before a date/time for a scheduled communication. If the answer is "No," then the method starts over at step 2400. If the answer is "Yes," then a determination is made as to whether the advisor device, or the mobile application operating thereon, has been verified at step 2404. If the answer is "No," then a client device (e.g., cellular telephone, landline telephone, etc.) is called at step 2412 using a telephone number (e.g., callback number) that was previously provided by the client and associated with the client device. At step 2414, the advisor device (e.g., cellular telephone, landline telephone, etc.) is called at step 2414 using a telephone number that was previously provided by the advisor and associated with the advisor device. The connections with the client and advisor devices are then used to establish a communication between the client and advisor (e.g., by joining the existing telephone call with the advisor device to the existing telephone call with the client device, etc.), stopping the method at step 2416. If the advisor device/mobile application is verified at step 2404, then the client device is called at step 2406 (e.g., using the callback number previously provided by the client). A call is then placed to the application operating on the advisor device at step 2408 (e.g., using VoIP, SIP, etc.). The connections with the client device and the mobile application are then used to establish a communication between the client and the advisor (e.g., by joining the existing telephone call with the application to the existing telephone call with the client device, etc.), stopping the method at step 2416.

It should be appreciated that the present invention is not limited to the method illustrates in FIG. 24, and methods for establishing a communication between a client and an advisor that include fewer, additional, or different steps are within the spirit and scope of the present invention. For example, step 2404 may also determine whether a mobile application operating on the client device has been verified. If it has, the host device may call the application operating on the client device (e.g., at step 2406), instead of using the client-provided callback number. By way of another example, steps 2408, 2414 may be performed before or at substantially the same time as steps 2406, 2412.

The foregoing description of a system and method for using a host device to facilitate a communication between at least a first party (e.g., a client) and a second party (e.g., an advisor) has been presented for the purposes of illustration and description. It is not intended to be exhaustive or to limit the invention to the precise forms disclosed, and many modifications and variations are possible in light of the above teachings. Those skilled in the art will appreciate that there are a number of ways to implement the foregoing features, and that the present invention it not limited to any particular way of implementing these features. The invention is solely defined by the following claims.

What is claimed is:

1. A method for using at least one host device to facilitate a communication between a client and an advisor, comprising:
   recording a time for said communication between said client and said advisor;
   receiving from said client a phone number associated with a client device, said client device being used by said client to participate in said communication with said advisor; and
   facilitating said communication between said client and said advisor, comprising:
      receiving from an application operating on an advisor device a request to use said application to at least participate in said communication with said client, said application being used to at least provide information to said advisor concerning said communication;
      placing by said at least one host device a first telephone call to application in response to receiving said request;
      using said first telephone call to verbally request verification data from said advisor, said verification data being used to confirm that said application can be used by said advisor to participate in said communication with said client;
      receiving said verification data from said application during said first telephone call;
      terminating said first telephone call once said verification data has been received;
      using said telephone number to place a second telephone call to said client device at said time for said communication, thereby establishing a first connection between said at least one host device and said client device;
      placing a third telephone call to said application at said time for said communication in response to receiving said verification data, thereby establishing a second connection between said at least one host device and said application; and
      using by said at least one host device said first connection and said second connection to establish an open connection between said client device and said advisor device, thereby allowing said client and said advisor to verbally communicate with one another;
   wherein at least one of said first, second and third telephone calls is placed using one of voice over Internet protocol (VOIP) and session initiated protocol (SIP).

2. The method of claim 1, wherein said step of recording a time for said communication further comprises receiving a schedule of available times from said advisor and receiving a request from said client for said communication with said advisor at said time, said schedule of available times including at least said time.

3. The method of claim 2, further comprising the step of using said application to provide said schedule of available times to said remote host.

4. The method of claim 1, wherein said step of recording a time for said communication further comprises receiving a request from said client for said communication with said advisor at said time and receiving an acceptance from said advisor of said time for said communication.

5. The method of claim 4, further comprising the step of using said application to provide said acceptance of said time for said communication to said remote host.

6. The method of claim 1, wherein said step of receiving a request to use said application to participate in said communication with said client comprises using said application to establish a connection between said advisor device and said host device, said step of placing said first telephone call being performed in response to said connection being established between said advisor device and said at least one host device.

7. The method of claim 6, wherein said step of using said application to establish a connection between said advisor device and said at least one host device is performed in response to said advisor logging into said application.

8. The method of claim 1, wherein said step of placing by said at least one host device a first telephone call to said application comprises using a cellular telephone number associated with said advisor device to place said first telephone call to said application.

9. The method of claim 1, wherein said step of receiving said verification data from said application further comprises receiving a verbal verification from said advisor during said first telephone call.

10. The method of claim 1, wherein said steps of requesting and receiving said verification data comprises verbally instructing said advisor to press at least one button in order to verify said first telephone call and receiving confirmation that said at least one button has been pressed on said advisor device.

11. A system for facilitating a communication between a client and an advisor, comprising:
    at least one host in communication with at least one wide area network (WAN) and comprising at least one memory device for storing machine readable instructions adapted to perform the steps of:
        recording a time for said communication between said client and said advisor;
        receiving from said client a phone number associated with a client device, said client device being used by said client to participate in said communication with said advisor;
        receiving from an application operating on an advisor device a request to use said application to at least participate in said communication with said client, said application being used to at least provide information to said advisor concerning said communication;
        placing a first telephone call to said application in response to receiving said request;
        using said first telephone call to verbally request verification data from said advisor, said verification data being used to confirm that said application can be used by said advisor to participate in said communication with said client;
        receiving said verification data from said application during said first telephone call;
        using said telephone number to place a second telephone call to said client device at said time for said communication, thereby establishing a first connection between said at least one host and said client device;
        using said verification data to place a third telephone call to said application at said time for said communication, thereby establishing a second connection between said at least one host and said application; and
        using said first connection and said second connection to establish a communication link between said client device and said application, said communication link being used by said client and said advisor to participate in said communication;
        wherein at least one of said first, second and third telephone calls is placed using one of voice over Internet protocol (VOIP) and session initiated protocol (SIP).

12. The system of claim 11, wherein said step of recording a time for said communication further comprises receiving from said advisor via said application a schedule of available times from said advisor and receiving a request from said client for said communication with said advisor at said time, said schedule of available times including at least said time.

13. The system of claim 11, wherein said step of recording a time for said communication further comprises receiving a request from said client for said communication with said advisor at said time and receiving an acceptance from said advisor via said application of said time for said communication.

14. The system of claim 11, wherein said step of receiving a request to use said application to participate in said communication with said client comprises using said application to establish a connection between said advisor device and said host, said step of placing said first telephone call being performed in response to said connection being established between said advisor device and said at least one host.

15. The system of claim 14, wherein said step of using said application to establish a connection between said advisor device and said at least one host is performed in response to said advisor logging into said application.

16. The system of claim 11, wherein said step of placing a first telephone call to said application comprises placing a telephone call to a cellular telephone number associated with said advisor device.

17. The system of claim 11, wherein said step of receiving said verification data from said application further comprises receiving a verbal verification from said advisor during said first telephone call.

18. The system of claim 11, wherein said steps of requesting and receiving said verification data comprises verbally instructing said advisor to press at least one button in order to verify said first telephone call and receiving confirmation that said at least one button has been pressed on said advisor device.

19. A method for facilitating a communication between a client and an advisor, comprising:
    receiving a first communication from an application operating on an advisor device, said application being used to provide said advisor with a time for said communication, provide information on said client, and allow said advisor to participate in said communication;
    placing a first telephone call from at least one host to said application in response to receiving said first communication;
    using said first telephone call to verbally request verification data from said advisor, said verification data being data that can be provided by said advisor using said application;
    receiving said verification data from said application during said first telephone call;
    using a telephone number associated with a client device to place a second telephone call to said client device at said time for said communication, thereby establishing a first link between said at least one host and said client device;
    placing in response to said verification data a third telephone call to said application at said time for said communication, thereby establishing a second link between said at least one host and said advisor device; and
    using said first and second links to allow said client and said advisor to participate in said communication;
    wherein at least one of said first, second and third telephone calls is placed using one of voice over Internet protocol (VOIP) and session initiated protocol (SIP).

20. The method of claim 19, wherein said step of requesting said verification data from said advisor comprises verbally instructing said advisor to use said application to provide certain data to said host during said first telephone call, said certain data being verbally identified to said advisor during said first telephone call.

* * * * *